United States Patent
Calleija et al.

(10) Patent No.: US 11,337,354 B2
(45) Date of Patent: May 24, 2022

(54) AUTOMATIC TARGET RECOGNITION AND MANAGEMENT SYSTEM

(71) Applicant: Agerris Pty Ltd, Chippendale (AU)

(72) Inventors: Mark Calleija, West Ryde (AU); Salah Sukkarieh, Kogarah (AU)

(73) Assignee: AGERRIS PTY LTD, Chippendale (AU)

( * ) Notice: Subject to any disclaimer, the term of this patent is extended or adjusted under 35 U.S.C. 154(b) by 2 days.

(21) Appl. No.: 16/892,905

(22) Filed: Jun. 4, 2020

(65) Prior Publication Data
US 2020/0296875 A1 Sep. 24, 2020

Related U.S. Application Data

(62) Division of application No. 15/579,636, filed as application No. PCT/AU2016/050450 on Jun. 3, 2016, now Pat. No. 10,701,852.

(30) Foreign Application Priority Data

Jun. 5, 2015 (AU) ................................ 2015902116

(51) Int. Cl.
*A01B 39/18* (2006.01)
*A01B 79/00* (2006.01)
(Continued)

(52) U.S. Cl.
CPC ............ *A01B 39/18* (2013.01); *A01B 63/004* (2013.01); *A01B 79/005* (2013.01); *A01M 21/02* (2013.01);
(Continued)

(58) Field of Classification Search
CPC ... A01B 39/18; A01B 63/1112; A01B 79/005; A01M 21/02; A01M 21/04; A01M 21/043
See application file for complete search history.

(56) References Cited

U.S. PATENT DOCUMENTS

| | | |
|---|---|---|
| 3,425,495 A | 2/1969 | Reeve et al. |
| 3,444,933 A | 5/1969 | Daellenbach |
| (Continued) | | |

FOREIGN PATENT DOCUMENTS

| | | |
|---|---|---|
| CN | 101990796 A | 3/2011 |
| CN | 102282922 A | 12/2011 |
| (Continued) | | |

OTHER PUBLICATIONS

European Search Report for European Patent Application No. 16802255.6 dated Oct. 18, 2016 (13 pages).
(Continued)

*Primary Examiner* — Gary S Hartmann
(74) *Attorney, Agent, or Firm* — Shumaker, Loop & Kendrick, LLP

(57) ABSTRACT

An apparatus for controlling weeds, which includes a tine formation adapted to remove or disrupt targeted weeds, and a tine support assembly adapted to support the tine for movement about a first control axis in a generally vertical direction between an engaged position wherein the tine formation in use contacts a ground surface for removal or disruption of targeted weeds and a disengaged position wherein the tine formation is substantially retracted from the ground surface. The tine support assembly is further adapted to support the tine for movement about a second control axis in a generally horizontal direction. The tine support assembly further includes a first actuation mechanism adapted to effect movement of the tine about the first control axis, and a second actuation mechanism adapted to effect movement of the tine about the second control axis. The apparatus also includes a sensing system for sensing aspects of an environment and generating data indicative thereof, and a classification system for identifying target weeds within the environment on the basis of the data from the sensing
(Continued)

system. A control system is adapted to activate the first and second actuation mechanisms of the tine support assembly in accordance with a predetermined control logic thereby sequentially to position the tine for disruptive contact with the targeted weeds.

8 Claims, 17 Drawing Sheets

(51) Int. Cl.
| | |
|---|---|
| *A01M 21/04* | (2006.01) |
| *A01M 21/02* | (2006.01) |
| *A01B 63/00* | (2006.01) |
| *A01B 69/00* | (2006.01) |
| *A01B 63/111* | (2006.01) |
| *A01B 51/02* | (2006.01) |
| *A01B 63/02* | (2006.01) |
| *A01B 63/12* | (2006.01) |
| *A01B 63/104* | (2006.01) |

(52) U.S. Cl.
CPC .......... *A01M 21/04* (2013.01); *A01M 21/043* (2013.01); *A01B 51/02* (2013.01); *A01B 63/023* (2013.01); *A01B 63/104* (2013.01); *A01B 63/1112* (2013.01); *A01B 63/12* (2013.01); *A01B 69/001* (2013.01)

(56) References Cited

U.S. PATENT DOCUMENTS

| | | | |
|---|---|---|---|
| 3,708,016 A | 1/1973 | Shader | |
| 5,222,324 A | 6/1993 | O'Neall et al. | |
| 5,381,624 A | 1/1995 | Davis et al. | |
| 5,842,307 A | 12/1998 | May | |
| 6,443,365 B1 | 9/2002 | Tucker et al. | |
| 6,671,582 B1 | 12/2003 | Hanley | |
| 6,919,959 B2 | 7/2005 | Masten | |
| 7,081,611 B2 | 7/2006 | Scott | |
| 7,748,470 B2 | 7/2010 | Ortiz | |
| 7,854,108 B2 | 12/2010 | Koselka et al. | |
| 8,179,533 B2 | 5/2012 | Alameh | |
| 8,498,786 B2 | 7/2013 | Anderson | |
| 8,930,095 B2 | 1/2015 | Anderson | |
| 9,119,388 B2 | 9/2015 | Jens | |
| 9,596,840 B1 | 3/2017 | Bourquin | |
| 9,717,171 B2 | 8/2017 | Redden et al. | |
| 10,701,852 B2 * | 7/2020 | Calleija | A01B 79/005 |
| 10,772,253 B2 * | 9/2020 | Calleija | A01M 7/006 |
| 2012/0297674 A1 | 11/2012 | MacKenzie | |
| 2014/0259898 A1 | 9/2014 | Jens | |
| 2014/0260148 A1 | 9/2014 | Jens | |
| 2017/0359943 A1 | 12/2017 | Calleija et al. | |
| 2018/0153084 A1 | 6/2018 | Calleija et al. | |
| 2018/0160673 A1 | 6/2018 | Albert et al. | |
| 2019/0082591 A1 | 3/2019 | Bassett | |
| 2019/0090408 A1 | 3/2019 | Redden et al. | |
| 2020/0375094 A1 * | 12/2020 | Calleija | A01D 34/008 |

FOREIGN PATENT DOCUMENTS

| | | |
|---|---|---|
| JP | H06113648 A | 4/1994 |
| JP | H096949 A | 1/1997 |
| KR | 20090109173 A | 10/2009 |
| WO | 2016193003 A1 | 12/2016 |

OTHER PUBLICATIONS

International Search Report and Written Opinion for International Application No. PCT/AU2016/050450 dated Aug. 23, 2016 (10 pages).

* cited by examiner

AUTOMATIC TARGET RECOGNITION AND MANAGEMENT SYSTEM

FIELD OF THE INVENTION

The present invention relates generally to an automated apparatus, method and system for managing weeds or similar pests in the context of agriculture, plant cultivation or environmental management.

The invention has been developed primarily for targeting and mechanical removal of weeds and will be described predominantly in this context. It should be appreciated, however, that the invention is not limited to this field of use, being potentially also adaptable for feeding or watering plants, harvesting produce, pollinating plants, trimming, pruning or thinning foliage, or other analogous purposes wherein the targeting and end-effector positioning systems may be effectively utilised. The invention is also potentially adaptable for identifying and controlling pests and diseases, in particular being potentially adaptable for detecting, controlling and/or removing foreign bodies from a site or predetermined region such as, for example, sticks, bones, mice, spiders, rats, insects, rubbish and other waste.

BACKGROUND OF THE INVENTION

The following discussion of the prior art is intended to place the invention in an appropriate technical context and enable its advantages to be more fully appreciated. However, any references to prior art throughout this specification should not be construed as an express or implied admission that such art is widely known or is common general knowledge in the relevant field.

It is well known that one of the most important aspects in agriculture and crop cultivation is the effective management of weeds. Weeds compete aggressively for limited resources in terms of space, water, sunlight and nutrients. Consequently, the emergence of weeds has a marked adverse impact on crop yield and quality. Moreover, due to their relatively fast growth rates compared to crops, if weeds are not eliminated or effectively managed, particularly during the early stages after crop planting, they can quickly dominate entire fields and result in serious yield losses.

In an attempt to ameliorate this problem, various chemical herbicides have been developed. However, a number of associated problems and limitations have emerged including the cost of these agricultural chemicals and associated application equipment, short and longer-term environmental toxicity effects, human toxicity effects including in some cases carcinogenic effects, increased herbicide resistance and incompatibility with organic farming techniques.

In an attempt to avoid these problems, a variety of mechanical weeding devices and systems have been developed, which can be broadly categorised as: —
- manual weeding implements and tools such as hoes;
- mechanical weeding implements adapted for towing behind tractors or similar vehicles and utilising tines, hoes, brushes or blades to kill, remove or disrupt weeds; and
- robotic systems using automated or semi-automated manipulators to remove or disrupt targeted weeds.

Robotic systems offer potential benefits in terms of automation and hence reduced labour cost. However, to date such systems have been prone to significant disadvantages or shortcomings including one or more of: an inability to accurately and consistently discriminate between weeds and crops or other plants; lack of precise control over manipulators; an inability to trace complex trajectories and operate effectively outside highly ordered or structured environments; an inability to accurately target weeds in close proximity to crops or other obstacles; an inability to integrate effectively with a variety of vehicular or other operating platforms; excessive size; excessive power consumption; poor reliability; and/or excessive cost.

It is an object of the present invention to overcome or ameliorate one or more disadvantages of the prior art, or at least to provide a useful alternative.

SUMMARY OF THE INVENTION

Accordingly, in a first aspect, the invention provides an apparatus for controlling weeds, the apparatus including:

a tine formation adapted to remove or disrupt targeted weeds;

a tine support assembly adapted to support the tine formation for movement about a first control axis in a generally vertical direction between an engaged position wherein the tine formation in use contacts a ground surface for removal or disruption of targeted weeds and a disengaged position wherein the tine formation is substantially retracted from the ground surface, the tine support assembly being further adapted to support the tine formation for movement about a second control axis in a generally horizontal direction;

the tine support assembly further including a first actuation mechanism adapted to effect movement of the tine formation about the first control axis, and a second actuation mechanism adapted to effect movement of the tine formation about the second control axis;

a sensing system for sensing aspects of an environment and generating data indicative thereof;

a classification system for identifying target weeds within the environment on the basis of the data from the sensing system; and a control system adapted to activate the first and second actuation mechanisms of the tine support assembly in accordance with a predetermined control logic thereby to position the tine formation for disruptive contact with the targeted weeds.

The term "disruptive contact" as used herein is intended to be interpreted broadly from a functional perspective, encompassing any degree of direct contact sufficient to kill, remove, damage, disturb, disrupt or dislodge a targeted weed, as well as close proximity without direct contact but sufficient indirectly to kill, remove, damage, disturb, disrupt or dislodge the foliage, root system or soil surrounding the targeted weed so as to impede further growth or propagation.

In one embodiment, the tine support assembly includes a resilient bias mechanism adapted in the engaged position to urge the tine downwardly into contact with the ground surface with a bias force, whereby the tine is able to penetrate the ground surface to a degree sufficient to effectively remove or disrupt the targeted weeds, while allowing a degree of retraction of the tine against the bias force, while in the engaged position, to automatically accommodate obstacles such as rocks, soil clumps, irrigation lines or other obstacles.

In one embodiment, the resilient bias mechanism takes the form of one or more mechanical springs. In other embodiments, the resilient bias mechanism takes the form of elastic straps or bands. In yet other embodiments, pneumatic or electromagnetic spring mechanisms may be used. The spring mechanism may be fixed, statically adjustable or dynamically adjustable, for example to accommodate different degrees of soil hardness or compaction, different varieties of weeds or crops, different configurations of tines, and other relevant factors. Additionally, the actuation mechanism may be operated so as to emulate a dynamic spring, for example by operating the controller in torque mode, whereby torque can be sensed through changes in current, hydraulic pressure, pneumatic pressure, or by means of torque sensors. Complementary damping elements may also be incorporated into the spring mechanism and again these elements may be fixed, statically adjustable or dynamically adjustable. In some embodiments, the apparatus includes a spring mechanism operable in relation to the first control axis, to return the tine to the disengaged or a home position, thereby reducing energy consumption and providing a safe, convenient and deterministic fail state.

Preferably, the second actuation mechanism is operable to effect movement of the tine in a generally horizontal direction with the tine in the engaged position in contact with the ground, in a manner reminiscent of a seismograph tracer, whereby the tine controllably traces a path responsive to the control system, in order to target weeds within the operational envelope. In some embodiments, the tine is designed and structured for relatively high lateral stiffness to facilitate accurate lateral positioning, in conjunction with relatively low vertical stiffness to provide passive spring or resilient deformation characteristics in the vertical direction.

In one embodiment, the first actuation mechanism includes an hydraulic, pneumatic or electro-mechanical actuator adapted to move the tine generally vertically about the first control axis between the engaged and disengaged positions. In one relatively straightforward form, a simple two-position actuator is used. In other more sophisticated embodiments, progressive actuators or electric servo motors may be used in order to provide progressive, proportional or incremental control of the tine between the engaged and disengaged positions.

Similarly, the second actuation mechanism may include an hydraulic, pneumatic or electro-mechanical actuator adapted to move the tine laterally about the second control axis between predetermined outer limit positions. In one relatively straightforward form, this may also be a simple two-position actuator. In other more sophisticated embodiments, progressive actuators or electric servo motors are preferably used in order to provide progressive, proportional or incremental control of the tine between the limits of lateral excursion.

In one embodiment, the tine incorporates or supports a fluid conduit, which may be adapted to convey a liquid pesticide, herbicide, fertiliser or other agricultural chemical or additive in the form of a jet, steam, drip feed or spray, to the targeted weeds, or alternatively to targeted crops. In a variation of this embodiment, the fluid conduit may be adapted to convey a jet or spray of liquid such as water to facilitate removal, dislodgement or disruption of the targeted weeds. In one form, for example, a water jet regulated by the control system in conjunction with the tine may be used to physically sever the stems of the targeted weeds. It will be appreciated that this functionality may also be used under alternative targeting and control logic as a means of systematically irrigating, pruning, trimming, thinning, edging or harvesting plants or crops. In further embodiments, the fluid conduit may also be used in conjunction with the tine as a seed-feeding and planting mechanism. The fluid conduit may also be used to convey fine particulates or powders in a stream of carrier liquid or gas, such as air, for a variety of purposes including artificial pollination.

In a second aspect, the invention provides an apparatus for controlling weeds, the apparatus including:

a plurality of tine formations disposed in a generally transverse linear array, each tine formation being operable in use to remove or disrupt targeted weeds;

a tine support assembly adapted to support each of the tine formations for movement about a first control axis in a generally vertical direction, whereby each tine formation in the array is independently movable in use between an engaged position wherein the respective tine formation contacts a ground surface for removal or disruption of targeted weeds and a disengaged position wherein the tine formation is substantially retracted from the ground surface, the tine support assembly further including a plurality of first actuation mechanisms, each adapted to effect movement of a respective one of the tine formations about the first control axis;

a sensing system for sensing aspects of an environment and generating data indicative thereof;

a classification system for identifying target weeds within the environment on the basis of the data from the sensing system; and a control system adapted independently to activate the first actuation mechanisms of the tine support assembly in accordance with a predetermined control logic thereby to position the respective tine formations for disruptive contact with the targeted weeds.

In this form of the invention, it will be appreciated that the horizontal control dimension provided by the second control axis and associated actuation mechanism of the first aspect of the invention, is effectively provided by selection and actuation of the appropriate tine, or combination of tines, within the linear array. It should be appreciated that the rotational control axes of the tines in this embodiment need not be collinear, but may alternatively be offset, staggered or arranged in other configurations. Such alternative arrangements may diminish the likelihood of clashes between adjacent tines and/or reduce the likelihood of rocks or other debris becoming entangled in or between the tines.

In one embodiment, the apparatus is adapted to be propelled or drawn by a prime mover such as a tractor, harvester, utility vehicle, truck, quad or the like. In such cases, the apparatus may be fixed to or integrated with the prime mover, or towed behind, for example in a trailer or other ancillary powered or unpowered vehicle.

In one embodiment, the apparatus is attached to, towed or pushed by, or integrated with, an unmanned ground vehicle (UGV), for example of the type adapted to traverse successive rows of crops. In one preferred form, an omni-directional, self-propelled, autonomous UGV is utilised. Control of the UGV may be partly or fully automated as part of an overall environmental scanning, route planning, and targeting control methodology, optionally operating systematically in conjunction with a plurality of like or complementary autonomous vehicles.

In some embodiments, the tine support assembly includes additional degrees of freedom, to provide more flexibility for positioning and orienting the tine. For example, in one embodiment the tine support assembly of the targeting mechanism may be adapted for movement around additional rotational control axes, and/or along translational control axes. In some embodiments, the tine is telescopically extensible.

In one embodiment, the tine and support assembly constitute the end effector of a multi-DoF (multiple degrees of freedom) robotic arm, with the robotic arm providing at least one kinematic degree of freedom at each of a plurality of revolute joints, connected by intermediate links. In some embodiments, the robotic arm itself may comprise the tine support assembly and the associated targeting mechanism.

In some embodiments, the sensing system includes a camera adapted to generate a 2-D image of the environment, and the control system includes a mathematical transformation algorithm to correlate the pixel space of the image from the camera to the positions of the actuators in the tine support assembly. More sophisticated embodiments utilise 3-D imaging and multi-modal sensing for mapping and localisation. Examples of sensors that may be used for mapping and localisation include infrared, ultraviolet, visual, laser ranging or Lidar, hyperspectral, inertial, acoustic and radar-based sensing systems.

In one embodiment, the apparatus includes a second sensing system for sensing in real time the position and orientation of the tine, as part of a feedback control loop. This enables the possibility of collision detection with non-targets, determining success rate for targets, detecting anomalies such as inadvertent deposition of dirt or debris onto non-targets, and other potentially useful control inputs. In other embodiments, however, it will be appreciated that parameters related to the position and orientation of the tine may alternatively be determined or calculated by means of an open loop control strategy, optionally utilising respective pre-defined intermediate reference or waypoints for the actuators regulating the position or orientation of the tine. In some embodiments, at least one sensor of the sensing system may be mounted directly on the tine, to facilitate targeting.

Preferably, the control system includes a prioritisation algorithm for prioritisation of targets for the apparatus. In one embodiment, the algorithm is based on a relatively simple "first-in-first-out" (FIFO) prioritisation strategy. In other embodiments, however, additional optimisation parameters may be incorporated into the control strategy, including vehicle velocity, time or distance required for the tine to reach each target, related consequences (e.g. inadvertently hitting a neighbouring plant rather than a targeted weed in close proximity), opportunity value parameters such as the relative size of different target weeds, or the like.

The control system preferably also includes a strategy for global registration, whereby global coordinates of each target are estimated using one or more sensors. In some embodiments, this strategy records a centre position for each target that has been hit, and verifies that any subsequently identified target is beyond a predetermined minimum distance, (for example, an error or exclusion zone defined within an error circle, ellipse or other geometrical boundary) from targets that have previously been hit, with potential targets within those zones being disregarded in favour of the next target. In some embodiments, the dimensions of these error or exclusion zones are fixed, or adjustable, around the recorded or calculated centre position for each target.

In some embodiments, the control algorithm includes a methodology for dynamically determining, assigning and storing for each target a unique error or exclusion zone, based on real-time data relating to specific inputs such as errors in imaging, real time kinematic (RTK) data, ranging data, and the like.

In more sophisticated embodiments, the state information of the features in the environment are incorporated into a world map, which includes dimensions such as mapping, localisation, feature classification (weeds, crops etc), feature states (such as what has been hit), error estimation, exclusion zones and/or memory of previous world maps or parts thereof.

In some embodiments, multiple robots or autonomous UGVs are networked and configured to communicate with a central control system, which is adapted to store state information and generate higher level plans. Another variation utilises a decentralised system, wherein multiple robots can communicate and coordinate directly between themselves, thereby obviating the need for a central control system.

In a third aspect, the invention provides an apparatus for controlling weeds, the apparatus including:

a tine formation adapted to remove or disrupt targeted weeds;

a tine support assembly adapted to support the tine formation for movement about at least one control axis in a predetermined direction between an engaged position wherein the tine formation in use contacts a ground surface for removal or disruption of targeted weeds and a disengaged position wherein the tine formation is substantially retracted from the ground surface;

the tine support assembly further including at least one actuation mechanism adapted to effect movement of the tine formation about the control axis;

a sensing system for sensing aspects of an environment and generating data indicative thereof;

a classification system for identifying target weeds within the environment on the basis of the data from the sensing system; and a control system adapted to activate the actuation mechanisms of the tine support assembly in accordance with a predetermined control logic thereby sequentially to position the tine formation for disruptive contact with the targeted weeds.

In a further aspect, the invention provides an apparatus for controlling weeds, the apparatus including:

a weeding implement for disrupting a targeted weed or pest;

a vacuum system having a suction device (e.g. nozzle) arranged adjacent to the weeding implement;

a support assembly adapted to support the weeding implement and suction device for movement about at least one control axis in a predetermined direction between an engaged position wherein the weeding implement in use contacts a ground surface for disruption of the targeted weed or pest and a disengaged position wherein the weeding implement is substantially retracted from the ground surface;

the support assembly further including at least one actuation mechanism adapted to effect movement of the weeding implement and suction device about the control axis;

a sensing system for sensing aspects of an environment and generating data indicative thereof;

a classification system for identifying target weeds or pests within the environment on the basis of the data from the sensing system; and a control system adapted to activate the actuation mechanism of the support assembly in accordance with a predetermined control logic thereby sequentially to position the weeding implement for disruptive contact with the targeted weeds or pests, and the suction device for subsequent removal of the disrupted weeds or pests.

In some embodiments, the actuation mechanism is adapted for controlling movement of the weeding implement and suction device with reference to a cartesian, SCARA, parallel, polar, or other coordinate reference system.

It will be appreciated that such arrangements incorporating a vacuum system for removing disrupted weeds or pests can, in certain embodiments, offer advantages in terms of minimising undesirable seed spreading, thereby potentially reducing weed occurrence rates over time as the seeds and weeds themselves are completely removed from cropping soil.

In further aspects, the invention provides automated methods and systems for identifying, targeting and removing or disrupting weeds, using the apparatus as described.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Figure 1:
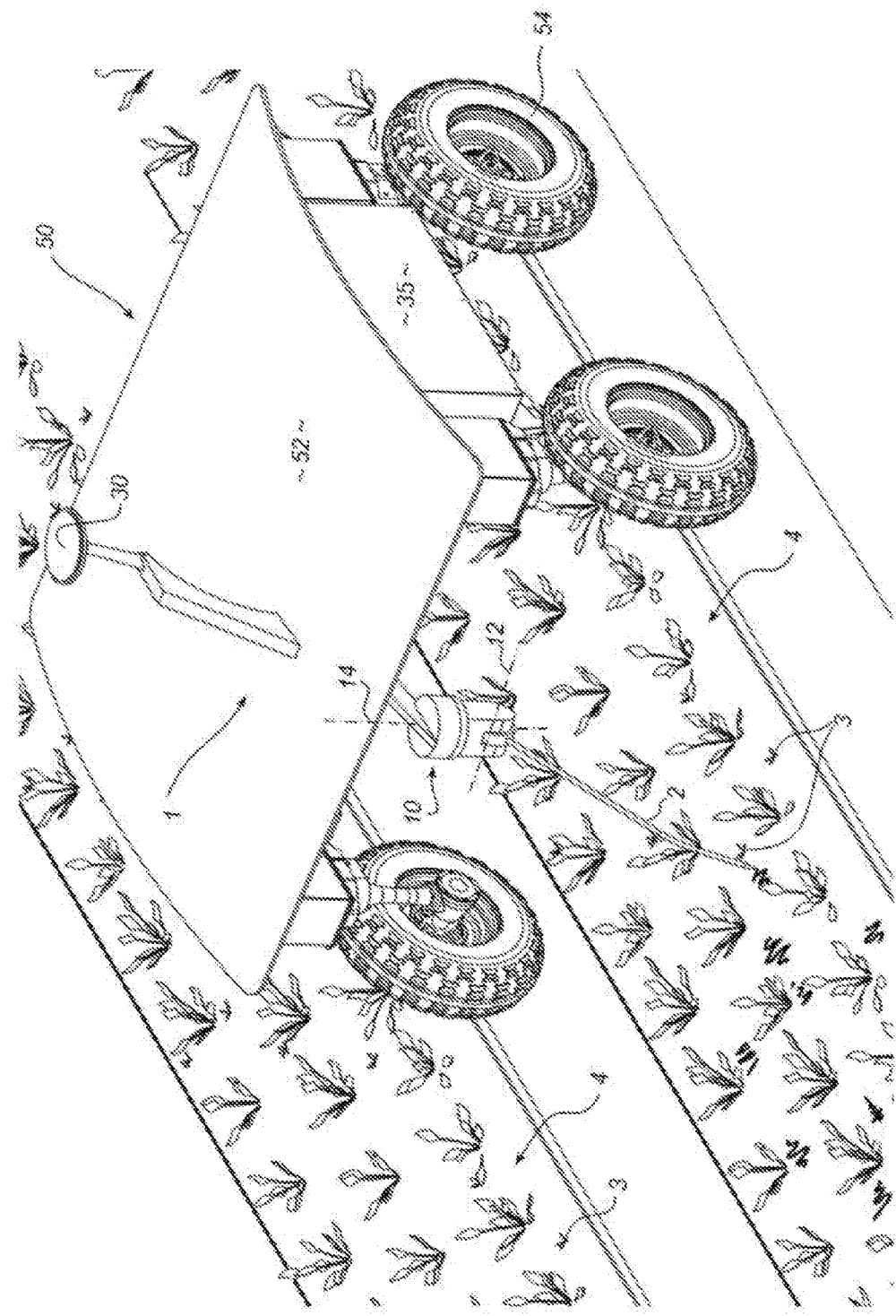
FIG. 1 is a perspective view of an autonomous agricultural weeding apparatus incorporated into an omni-directional unmanned ground vehicle (UGV) with the tine formation in the engaged position, in accordance with a first embodiment of the invention.
Figure 2:
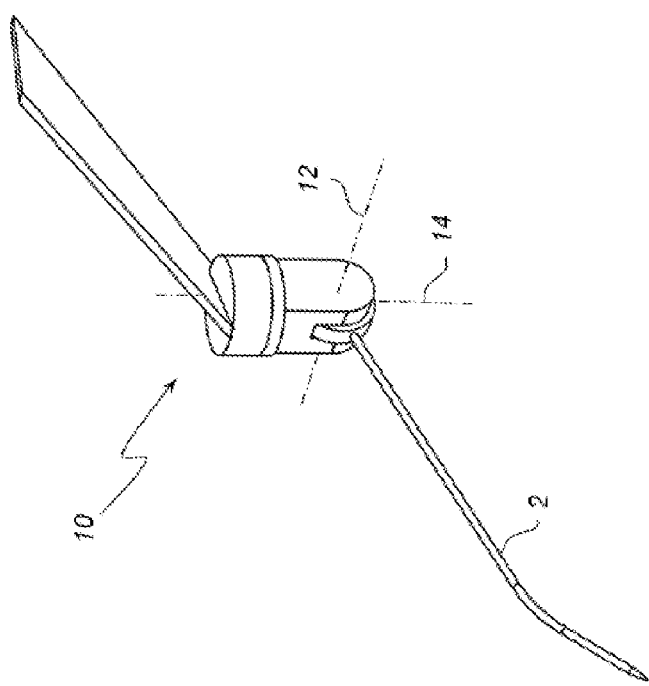
FIG. 2 is an enlarged perspective view showing the weeding tine and tine support assembly of the apparatus of FIG. 1 in more detail.

Referring initially to FIGS. 1 and 2, the invention provides an autonomous weeding apparatus 1. The apparatus includes a tine formation 2 adapted to remove, dislodge or disrupt targeted weeds 3 as the tine is drawn along a planted row or seed bed 4.

A tine support assembly 10 is adapted to support the tine 2 for movement in a generally vertical direction about a horizontally oriented first control axis 12. In this way, the tine is movable in use between a downwardly oriented engaged position (as shown in FIG. 1) wherein the tine contacts or penetrates the ground surface for removal or disruption of the targeted weeds, and an upwardly oriented disengaged position wherein the tine is substantially retracted from the ground surface. The tine support assembly 10 is further adapted to support the tine for movement in a generally horizontal direction about a vertically oriented second control axis 14. In this embodiment, the tine support assembly takes the form of a turret providing orthogonal pan and tilt control axes for the tine. In other embodiments, however, it will be appreciated that these degrees of freedom may be oriented differently or provided in other ways, for example by translational movement or telescopic extension, optionally in conjunction with one or more rotational control axes.

The tine support assembly 10 further includes a first actuation mechanism 20 (housed within the turret but concealed from view in FIGS. 1 and 2) adapted to effect movement of the tine about the first control axis 12 and a second actuation mechanism 22 (also housed within the turret but concealed from view in FIGS. 1 and 2) adapted to effect movement of the tine about the second control axis 14.

In this embodiment, the first actuation mechanism takes the form of a first electric servomotor disposed within the body of the support assembly and adapted to rotate the tine about the first control axis between the engaged and disengaged positions. Similarly, the second actuation mechanism takes the form of a second electric servomotor also disposed within the body of the support assembly or turret and adapted to rotate the tine about the second substantially vertical control axis 14. It should be appreciated, however, that in other embodiments, the actuation mechanisms may alternatively include hydraulic, pneumatic, electro-mechanical or other suitable forms of actuation. These actuation mechanisms may involve relatively simple two-position actuation control, or in more sophisticated embodiments, proportional or incremental 2-axis control of the tine within its operational envelope.

Figure 3:
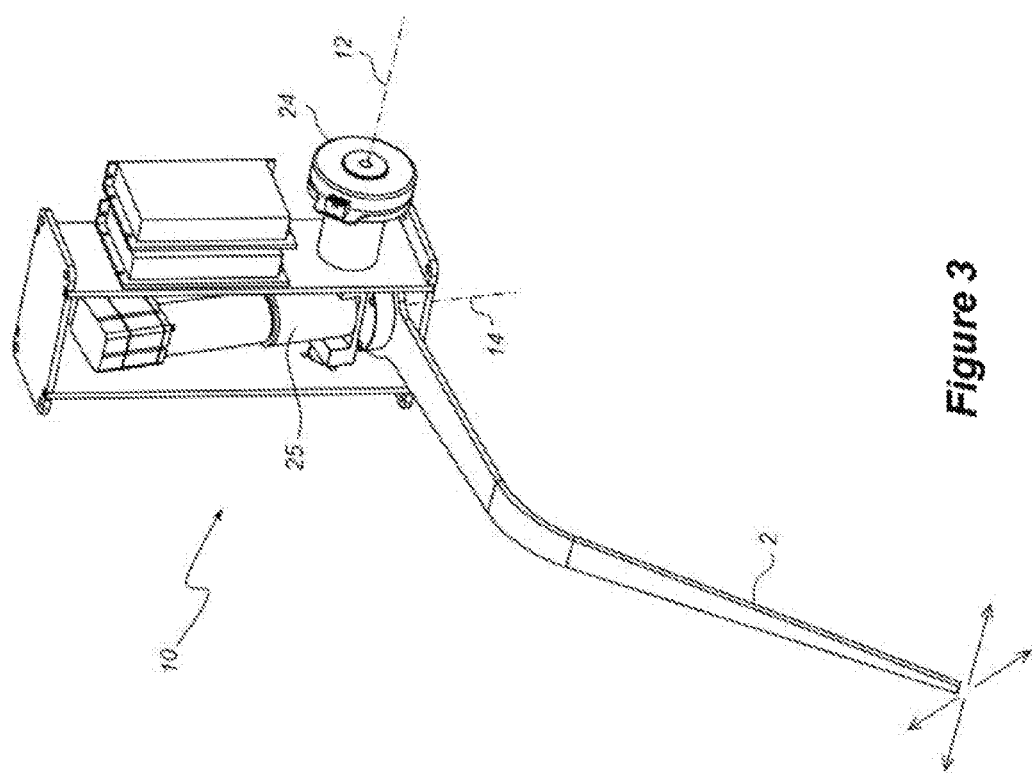
FIG. 3 is an enlarged perspective view similar to FIG. 2, showing an alternative embodiment of the weeding tine and tine support assembly for use with the apparatus of FIG. 1.

FIG. 3 shows an alternative embodiment of the tine and support assembly, for use in the apparatus of FIG. 1. In this case, it will be seen that the first actuation mechanism takes the form of a first electric rotary servomotor 24 adapted to effect rotation of the tine about the first horizontally oriented control axis 12, thereby to effect movement of the tine in the vertical direction between the engaged and disengaged positions. The second actuation mechanism takes the form of a second electric rotary servomotor 25 adapted to effect rotation of the tine about the second vertically oriented control axis 14, thereby to effect side-to-side movement of the tine in the horizontal direction while in the engaged position in contact with the ground. The movement of the tine in this control dimension is reminiscent of a seismograph tracer, whereby the tine controllably traces a path responsive to the control system, to facilitate disruptive contact with targeted weeds within the operational envelope, as described more fully below.

Figure 4:
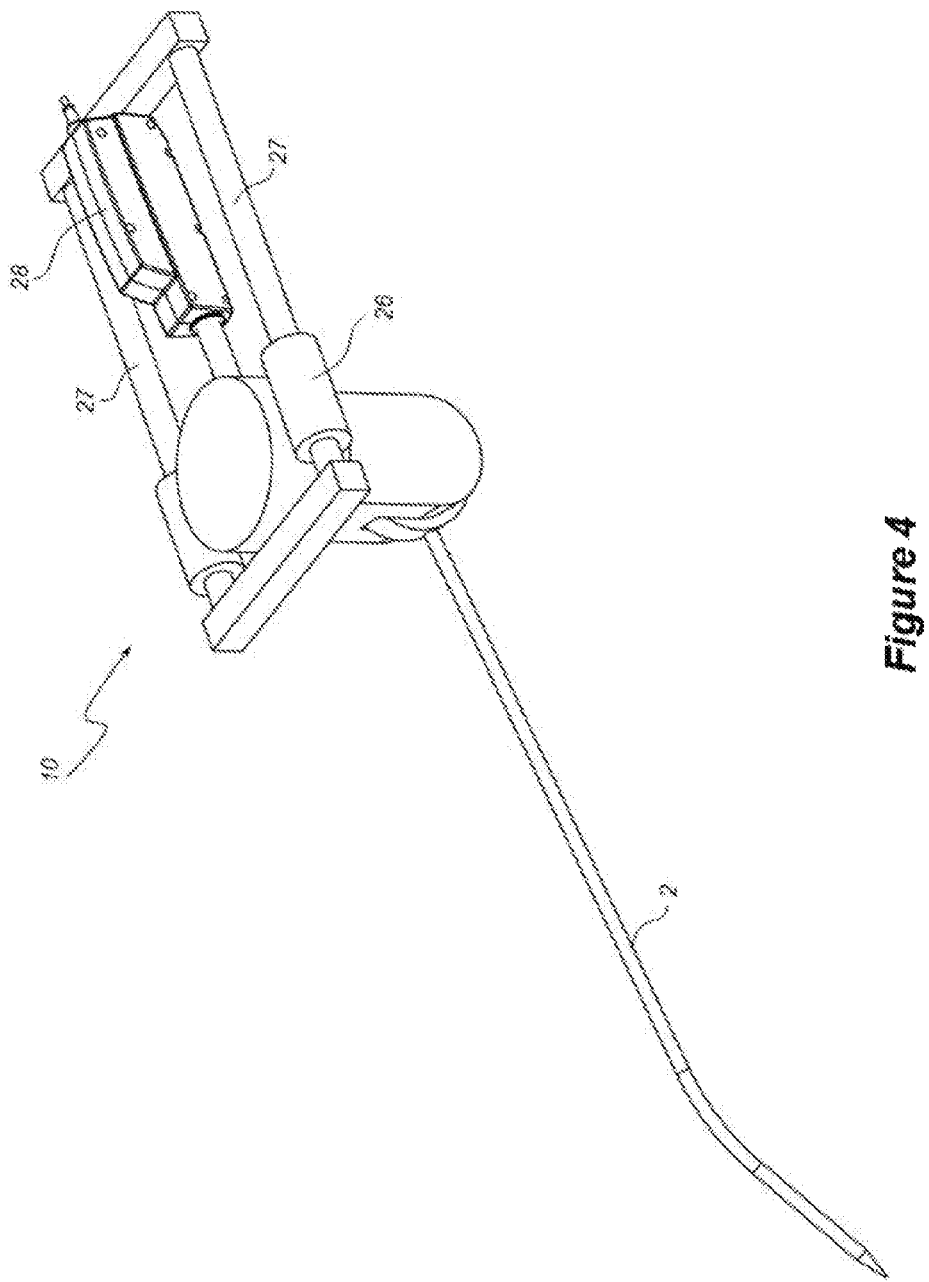
FIG. 4 is an enlarged perspective view, showing a further embodiment of the tine support assembly providing a third control axis, for use with the apparatus of FIG. 1.

FIG. 4 shows a further embodiment of the tine support assembly. In this case, it will be seen that the 2-axis turret of the support assembly is mounted on a carriage 26, which is slideably engageable with complementary guide rails 27. The carriage is thereby supported for a limited degree of linear excursion along a fore-aft axis, in response to movement of linear actuator 28. This arrangement provides a third control axis enabling forwards and backwards motion of the 2-axis tine support assembly. The additional control axis may be utilised to induce a higher relative velocity when the tine is targeting weeds and also, by enabling a degree of "backtracking", to reduce the number of missed weeds. This in turn may enable a higher constant vehicle speed and/or a higher weed kill rate in particular applications.

The apparatus further includes a sensing system 30 for sensing aspects of the environment and generating data indicative thereof. In some embodiments, the sensing system includes a camera adapted to generate a 2-D image of the environment, and the control system includes a mathematical transformation algorithm to correlate the pixel space of the image from the camera to the positions of the actuators in the tine support assembly. More sophisticated embodiments utilise 3-D imaging and multi-modal sensing for mapping and localisation. Examples of sensors that may be used for mapping and localisation include infrared, ultraviolet, visual, laser ranging or Lidar, hyperspectral, inertial, acoustic and radar-based sensing systems.

A classification system is provided to identify target weeds, and optionally also non-targets such as plants or crops, within the environment, on the basis of the data from the sensing system and appropriate classification criteria.

A control system 35 is adapted to activate the first and second actuation mechanisms of the tine support assembly 10, in accordance with predetermined control logic, thereby sequentially to position the tine so as to kill or at least disruptively contact the targeted weeds. The reference to predetermined control logic is intended to include adaptive algorithms and machine learning strategies that evolve or refine over time.

The tine or tine support assembly further includes a resilient bias mechanism adapted in the engaged position to resiliently urge the tine downwardly into operative contact with the ground surface, with a positive bias force. In this way, the tine is able to penetrate the ground surface to a degree sufficient to effectively kill, remove or disrupt the targeted weeds, while allowing retraction of the tine against the bias force to automatically accommodate obstacles such as rocks, soil clumps, irrigation lines or other obstacles. The resilient bias mechanism thereby acts as a form of suspension for the tine, maintaining optimal functional contact between the tine and the cultivated soil in the engaged position, with sufficient compliance to accommodate obstacles and undulations in the surface terrain.

In one embodiment, the resilient bias mechanism takes the form of one or more mechanical springs, positioned to urge the tip of the tine downwardly so as to penetrate the ground surface in the engaged position. In other embodiments, the resilient bias mechanism may take the form of elastic straps or bands. Further variations include pneumatic or electromagnetic spring mechanisms. In one form, the tine itself is formed from a material incorporating a degree of elasticity or resiliency, such as spring steel, whereby the resilient bias mechanism is inherent in the shape, configuration and material composition of the tine itself.

In various embodiments, the spring mechanism may be fixed, statically adjustable or dynamically adjustable to accommodate different degrees of soil hardness or compaction, different varieties of weeds or crops, different configurations of tine, and other relevant factors. Complementary damping elements (not shown) may also be incorporated into the resilient bias mechanism, and again in terms of damping characteristics, these elements may be fixed, statically adjustable or dynamically adjustable.

In some embodiments (not shown) the tine incorporates or supports a supplementary fluid conduit, which may be adapted to convey a liquid pesticide, herbicide, fertilizer or other agricultural chemical or additive to the targeted weeds, or alternatively to targeted crops. For example, in one variation of this embodiment, the tip of the tine may be used to mechanically dislodge weeds, while the fluid conduit associated with the same tine may be used with similarly precise targeting to add chemical fertilizer, irrigation water or other supportive agricultural chemicals to plants or crops under cultivation. In another variation, multiple fluid conduits may be integrated with or supported by the tine, for example one conduit to direct an herbicide toward targeted weeds, and another conduit to direct a fertiliser toward targeted plants.

In a further variation of this embodiment, the fluid conduit may be adapted to convey a jet of liquid such was water to facilitate removal, dislodgement or disruption of the targeted weeds. In one form, for example, a water jet regulated by the control system in conjunction with the tine may be used to physically sever the stems of targeted weed. It will be appreciated that this functionality may also be used under alternative targeting and control logic as a means of systematically irrigating, pruning, trimming, thinning, edging or harvesting plants or crops. In further embodiments, the fluid conduit may also be used in conjunction with the tine as a seed-feeding and planting mechanism.

The apparatus may be propelled by any suitable form of prime mover, and may also be mounted to a stationary platform. In the embodiment shown, the apparatus is attached directly to, or integrated with, an unmanned ground vehicle (UGV) 50. The UGV of the preferred embodiment is a compact, omni-directional vehicle incorporating a chassis 52, and four independently driven and independently steerable wheels 54 in conjunction with electric drive motors, batteries, optionally solar panels to extend battery life, as well as on-board sensors, control modules, memory and data storage modules, navigational equipment including GPS, receivers, transmitters and ancillary equipment as required. It will be appreciated that this vehicular platform provides further degrees of freedom to facilitate positioning and orientation of the tine, based on the positioning of the omni-directional platform of the UGV itself. If required for particular applications or to extend the operational envelope, the tine may also be mounted to the UGV platform by means of an intermediate robotic arm. In some embodiments, the tine may also be telescopically extensible in order to provide an additional degree of freedom of movement and extended operational range.

It should be understood that a wide variety of other ground-based vehicles are also envisaged for use in conjunction with the apparatus, with different numbers of wheels, tracks, legs or skids including rail-mounted carriages and a range of options for motive power, steering, navigation and the like. This extends to multi-legged autonomous walking vehicles or robots and unmanned aerial vehicles (UAVs). Moreover, it should be understood that multiple tines and associated support assemblies may be mounted to a single vehicular platform for substantially simultaneous coordinated operation, thereby providing redundancy, increased efficiency, extended operational range and potentially higher vehicle speed. Various embodiments of the system may also be retro-fitted to existing agricultural equipment or vehicles including tractors, trailers, ploughs, harvesters, quads, or the like.

In other embodiments (not shown), the apparatus may be attached to a fixed base station, optionally in conjunction with a plurality of like base stations disposed in spaced apart relationship, with adjoining or overlapping target zones, and operating in concert to provide effective coverage of a defined target area to be weeded.

Figure 5:
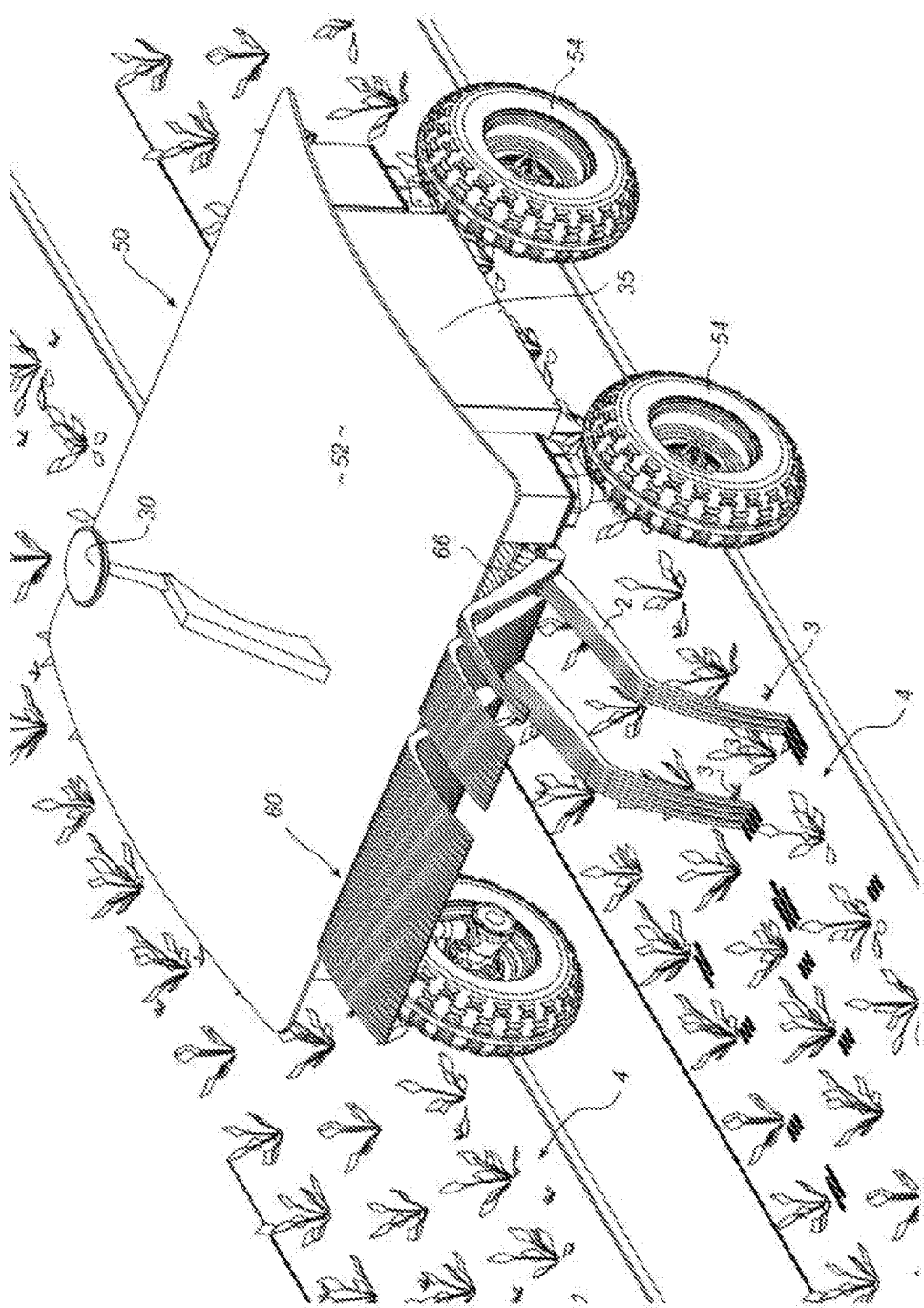
FIG. 5 is a perspective view of an autonomous agricultural weeding apparatus, incorporating a series of tines supported for independent actuation in a linear array, in accordance with a second form or aspect of the invention.
Figure 6:
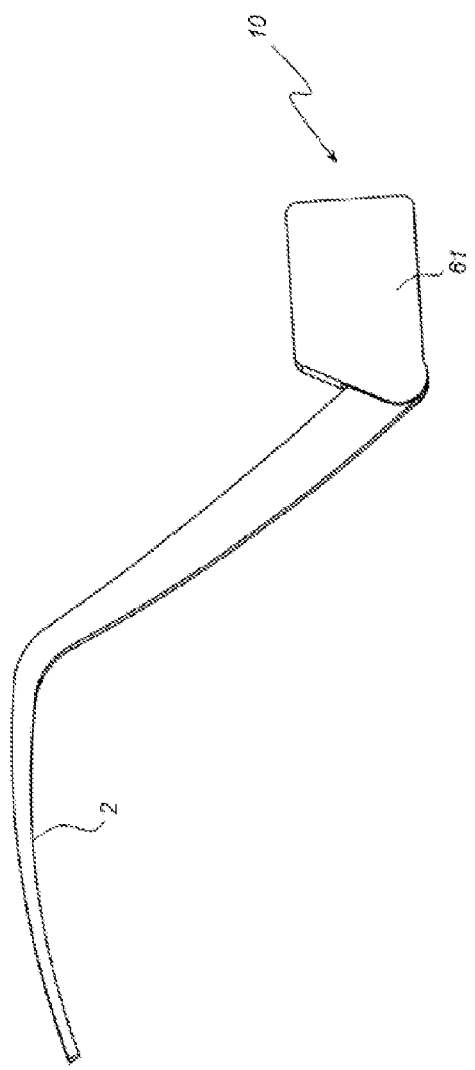
FIG. 6 is an enlarged perspective view showing one of the tines and associated tine support assemblies of the apparatus of FIG. 5.
Figure 7:
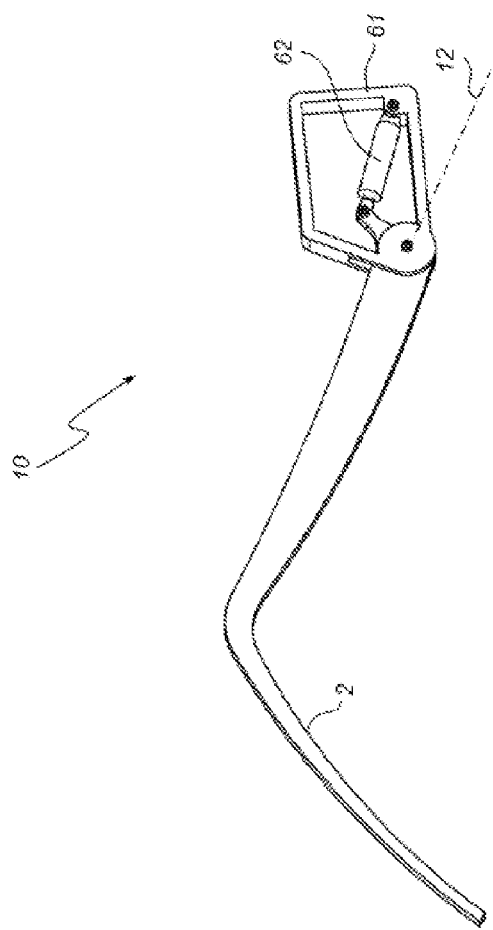
FIG. 7 is an enlarged perspective view similar to FIG. 6, showing alternative embodiments of the tine and tine support assembly, for use with the apparatus of FIG. 5.

A further form of the invention is shown in FIGS. 5 to 7, wherein similar features are denoted by corresponding reference numerals. This form is also integrated into an omnidirectional UGV 50. In this case, however, it will be seen that a plurality of tine formations 2 are disposed in a generally transverse linear array 60, each tine being operable in use to remove or disrupt targeted weeds. In this case, the tine support assembly is adapted to support the tines for movement in a generally vertical direction about the first control axis. Thus, each tine in the array is independently movable in use between the engaged position for removal or disruption of targeted weeds as the tine is drawn along the ground by the UGV, and a disengaged position wherein the tine is substantially retracted to a position above the ground surface. Although not shown in the interests of clarity, it will be understood that the apparatus may incorporate additional covers, housings, guards or shrouds as appropriate to provide adequate protection for the tines, support assemblies, actuators and associated componentry. The system may also include a user interface whereby an operator may interact directly with the system by means of a computer, mobile electronic device (wired or wireless) or remote control station.

FIG. 6 shows a first variation of the tine and associated support assembly 10 for this embodiment. In this case, the actuator (not shown) is mounted externally to the supporting body 61.

FIG. 7 shows a second variation of the tine and support assembly for this form of the invention, in which it will be seen that the linear actuator 62 is mounted substantially within the supporting body 61 to effect rotational movement of the tine about the horizontally oriented first control axis 12, and thereby to effect generally vertical movement of the remote end of the tine between the engaged and disengaged positions.

In this form of the invention, the discreet tine support assemblies 10 which are interconnected to form composite tine support assembly 66, include a plurality of the first actuation mechanisms 62, for example hydraulic or pneumatic actuators, or electric servomotors, each adapted to effect movement of a respective one of the tines about its corresponding first control axis. In this embodiment, the first control axes 12 of the tines are substantially coaxial but it should be appreciated that this need not necessarily be the case. For example, the tines may be staggered, alternately offset, or arranged in other suitable configurations.

It will also be noted that in this form of the invention, the individual tines are not supported for lateral or horizontal movement based on rotation about a second control axis. Rather, as best seen in FIG. 5, the horizontal control dimension is effectively provided by selection and actuation of the appropriate tine, or combinations or clusters of tines within the linear array, based on the control strategy. If required, a tine self-cleaning control mode may be implemented, whereby the tines clean themselves by way of relative movement or rapid shuffling between adjacent tines to dislodge earth, rocks or other debris.

In some embodiments, the system incorporates a conveyer system (e.g. belts, buckets, rollers) or other transfer means (e.g. vacuum, peristaltic pumps etc.) whereby the removed targets can be taken from the end effector then moved to a more suitable destination (e.g. a storage basket, tub, bin, incinerator, composter, or on the ground). Preferably the system is able to target weeds in a way that does not promote further weed growth by minimising weed seed dispersion.

In some embodiments, the biomass of the targeted weeds to be disposed of can be used as an energy source to provide power to the system. This can be achieved by either an on-board or off-board means for converting biomass into electricity, such as direct combustion, pyrolysis, gasification or anaerobic digestion.

In one embodiment the system incorporates various sensors to measure characteristics of the target. For example, scales and strain gauges can be used to measure weight, imaging sensors can measure colour, temperature sensors can measure the temperature, ranging and distance sensors can measure size etc. The information from these sensors may be used for data collection purposes, or more actively as part of a high level methodology where only targets meeting a certain criteria are targeted by the system (e.g. the system is commanded to only weed non-crop vegetation larger than 2 cm diameter). This could be used for selective weeding by being connected to a separate or integrated computer system that identifies which weeds should be targeted using the various sensors, and controls the end effector and manipulation devices to weed the targets. The operator can interact with the system at a high level to input high level commands, then the computer system can operate independently with high speed, complex computation and high precision and accuracy and then report back only the details of importance to the operator. In more advanced embodiments, the system can automatically detect and distinguish between types of weeds and take various corrective actions for each one. For example, all weeds of type A can be mechanically weeded, but all weeds of type B should not be mechanically weeded due to some adverse effects such as spreading seedlings. In this case, the system can automatically log and report on the success rate of the automatic mechanical weeding system as well as any outstanding weeds which may need require alternative methods such as hand removal, flaming or herbicide.

In one embodiment, sensors (e.g. visual, laser, ultrasound, switches) are installed as part of the end effector to determine the state of the target (e.g. weed) throughout the manipulation procedure. The system may incorporate optical flow sensors on the end effector in order to assist the manipulator to weed the target. This may be particularly useful when the platform or tine manipulator incorporates a level of dynamic behaviour which limits the positioning accuracy of the tine tip.

In certain preferred embodiments, the various sensors and control algorithms can advantageously provide relatively high speed and low cost spatial manipulation of the system and its end effector.

For mechanical weeding tasks, it is important in some embodiments that the system does not misclassify a non-target for a target. It preferably does this with near perfect accuracy (i.e. ~99.9%). This is important in order to avoid a crop that diminishes to low yields with many destructive passes. The following equation can be used to determine the approximate magnitude of potential losses caused by errors in the classification system:

$$\frac{cropDestroyed}{cropInitial} = 1 - ((1 - P(cropDetectedAsWeed))^{npasses})$$

For example, a system that incorrectly classifies 1% of the crop as weed will incorrectly destroy ~18% of the initial crop after 20 passes. If the system detects a weed as a crop, this is likely less severe than detecting a crop as a weed, because of the guaranteed loss of yield.

In some embodiments, the system is able to classify targets by inference using measurements of other sets. For example, assuming our system is able to detect vegetation using NDVI and from all vegetation we can classify what is a crop based on shape, colour, texture or prior positioning information. Then, the system is able to determine what is a weed because, what is vegetation and not crop is weed, or as a logical representation:

vegetation$\wedge$($\neg$crop)=weed

Furthermore, if the system can identify any two of vegetation, crop or weed with high accuracy, then it can infer the third with high accuracy.

In some embodiments, the system uses machine learning algorithms to determine what is a target and what is not a target. In other embodiments, known information can be used to improve the accuracy of the classification algorithms. Such an example is the structure of the crop pattern, which can be modelled based on the method of operation of the planting machine. Furthermore, the crop planting centre locations can be recorded at or shortly after the time of planting to also further improve the classifier accuracy.

In some embodiments, more than one seismograph weeder tine module are operating in concert. The system is able to coordinate the actuators to achieve the overall objective without the tines colliding into one another. In some embodiments, it is preferable to have enough seismograph tine modules such that in no case does a tine need to be lifted up and over a crop or other obstacle (e.g. drip line) in order to reach a target on the other side of the crop. In this situation, the number of tines required per bed is preferably one greater than the number of obstacle rows (e.g. 1+2 rows of lettuce+1 drip line=4 tines required).

In some embodiments the system includes static guards which prevent the tine from inadvertently striking an area that it should not, for example there may be safety guards to constrain the range of motion to a safe area to avoid the tines hitting the surrounding vehicle or users etc. Similarly, an irrigation drip line or the crop itself can be shielded from the tines by using guards protruding down into or slightly above the ground. In these embodiments, sensors may also be fitted to detect when a limit event has occurred (e.g. by using limit switches). Preferably moving parts of the machine are housed within a protective enclosure to minimise the risk of injury to persons nearby.

Preferably, a gearbox is used in combination with an electric motor in order to control the tine in order to increase the torque from the motor. Such gearboxes can include spur, planetary bevel, harmonic etc. Other means for increasing the force or torque from the actuator include the use of belts, pulleys, levers, hydraulic pistons and the like.

In one embodiment, a series of seismograph tines have independent actuators for operation in a plane parallel to the ground, and coupled actuators for operation in a plane perpendicular to the ground. This allows just a single actuator to lift or lower all seismograph tines from or to the ground, while each tine still has independent horizontal control.

Preferably the module allows for quick and easy swapping or replacement of the tines or end effector so the system can be configured by the user for a given application. In some embodiments, the end effector of the tine has an attachment or tip end which is selectively interchangeable so that various tip ends can be installed onto the tine, as required for various targets and environmental conditions.

For example, the end effector may be a multi-pronged weeding tool 40. In some embodiments, the multi-pronged weeding tool may be adapted such that the prongs can move, independently or jointly, between an open position and a closed grasping position, thereby to increase the efficiency and practicality of the mechanism. In some forms, the end effector may incorporate one or more actuators and sensors to control the various functions of the tool/prongs. In such embodiments, the end effector tool could be adapted to be pushed into the ground with the prongs in the open position, the prongs could then be closed to grab and uproot the weed by movement of the end effector in an upward direction away from the ground. In some embodiments, the multi-pronged weeding tool may be incorporated as part of a rotatable head.

In some embodiments, the end effector may include a releasable locking means having a plunger for energising a biasing element (e.g. spring) so as to positively hold the prongs in the closed position. To dispose of the weed, the locking means can be released by way of a latching mechanism (e.g. electromagnet, electromechanical latch etc.) selectively operable to act against the action of the spring and plunger. The energy of the spring, via the plunger, may cause the prongs to spring open towards the open position upon release of the locking means, thereby to throw or shoot the removed weed in a desired direction. In some embodiments, a bin or wheel trough is provided as the direct disposal destination for the removed weeds, whereby the end effector can drop or throw the weeds into the bin or wheel trough. Preferably, the bin incorporates one or more sensors (e.g. level, mass, etc.) for measuring an amount or level of the contents within the bin. In some embodiments, the bin has a discharge means for emptying the contents of the bin (e.g. manually or when the bin reaches a predetermined state (e.g. full) as determined by the sensors). In some embodiments, the discharge means may include an electromechanically operable door that can be selectively opened and closed by the control system, thereby to discharge the waste at a predefined waste disposal area. In other embodiments, the bin may be fitted with an actuator configured to angle or tip the bin in a similar control mode, thereby to facilitate discharging of the contents of the bin.

In other embodiments, the end effector may include a vacuum hose and/or nozzle 45 at or near the end of the tool, which leads to a bin, tank, receptacle or other area (e.g. wheel trough) as the disposal destination. The vacuum pressure and flow rate is preferably adjustable (manually or automatically) so that it will draw or suck up and remove the selected target, without substantially disturbing non-targets (e.g. weeds but not soil). To aid the removal procedure of rooted weeds, a mechanical removal tool end effector can be used in conjunction with a vacuum end effector so that once the weeds are uprooted, or loosened and close to uprooted by the mechanical tool, they are sucked away by the vacuum system.

In some embodiments, sensors (e.g. pressure, vision, mass etc.) are incorporated into the vacuum nozzle, hose or disposal bin to sense the success rate of targets vs. non targets (e.g. weeds vs. soil or other objects) being sucked up by the vacuum. The system is then able to automatically optimise the control and operating parameters of the vacuum (e.g. pressure, flow rate, nozzle diameter, mechanical depths for uprooting etc.) as part of a closed loop vacuum weeding system. In some embodiments, the vacuum is selectively enabled/disabled on demand in order to optimise energy consumption. In some embodiments, the vacuum system incorporates one or more passive filters (e.g. screens, gratings) or active filters (e.g. optical sorting systems) for separating targets from non-targets, or to direct different classes of targets to different destinations (e.g. first bin, second bin, etc). In further embodiments, the end effector tool may incorporate a mulching or shredding system, which automatically uproots and shreds/mulches the weeds for further disposal into the vacuum or other disposal unit (e.g. bin). In these and other modes, it is envisaged that the tine makes downward contact with the ground only when interacting with each target, and otherwise is stowed up above the ground waiting for the next target. Furthermore, the control of the vehicle carrying the weeding system can be coordinated with the planning of the weeding tool, as it may be preferable in some instances to stop the vehicle whilst performing each weeding operation, then control the motion of the vehicle towards the next target in a start/stop driving methodology of the vehicle to each target.

In some embodiments, the vacuum system may include one or more sensors (e.g. flow rate, pressure, current, power, acoustic etc.) for determining if there is a complete or partial blockage in the vacuum lines. In such embodiments, the system can positively respond to the blockage with one or more predetermined actions in an effort to remove the blockage. For example, the system may run the vacuum system in reverse (i.e. pumping air out rather than sucking air in), scraping the vacuum end effector on the ground, and/or generating a signal for alerting an operator that a blockage needs to be cleared.

In some embodiments, the tine itself is comprised of a relatively rigid hollow tube member which also acts as a vacuum tube. In other embodiments, the vacuum tube may be flexible or rigid and integrated as a secondary attachment to the main tine.

In some embodiments, the prongs for the end effector are designed for relative one way motion of the weeds or targets through the prongs; for example, using one way hooked teeth or oscillating spears/prongs that grab the weed but do not eject, continuously pushing new weeds up to a predetermined end position of the end effector, where a means for disposal of the weeds is located (e.g. vacuum tube or bin etc.).

In some embodiments, the profile of the tine is designed in a way such that it dampens the shock and vibrations. In certain embodiments, a spring and dampener mechanism can be installed in series, or parallel to, the tine mechanism, thereby to provide the desired damping characteristics.

It is envisaged that the weeding mechanisms will primarily be pulled by the prime mover such that the tines only move in one predetermined direction. In some embodiments, the tines incorporate a protection device or the system incorporates sensors to detect or prevent damage to the system if the prime mover attempts to push the mechanisms in the incorrect direction. For example, the system may be fitted with a motion sensor that can detect, for example, if the vehicle is travelling backwards, whereby the control system provides a signal to automatically lift all tines off the ground.

In some embodiments, a feature is incorporated for automatically changing the tip tool using a tool change mechanism. Preferably, the computer control systems can manually or automatically determine the desired tip tool model, whereby the computer system can accurately plan the tool path according to the specific nature of the tip tool fitted. Various tips can be fitted such as conventional sweeps, or specifically designed sweeping cutters for the application.

In some embodiments the tip tool is fitted with either a penetration depth sensor or a mechanism designed to passively limit the maximum penetration depth of the tine. For example, the tip tool can have a fixed or adjustable depth stop which allows for horizontal translation of the tip across the ground (e.g. in X- and Y-directions) when in forced contact with the ground, but prevents further movement into the ground (e.g. in a Z-direction) due to the large contact area of the depth stop preventing further penetration.

In some embodiments the tip tool is motorised such that it is capable of weeding even when the tine is not moving. For example, the tip tool may be in the form of, for example, a spinning jagged tooth face which points down and makes contact into the ground.

Illustrative examples of high-level control logic and control methodologies will now be described with reference to FIGS. 8 to 13. The detailed implementation of these methodologies for particular embodiments and applications of the invention will be within the knowledge and expertise of those skilled in the art.

Figure 8:
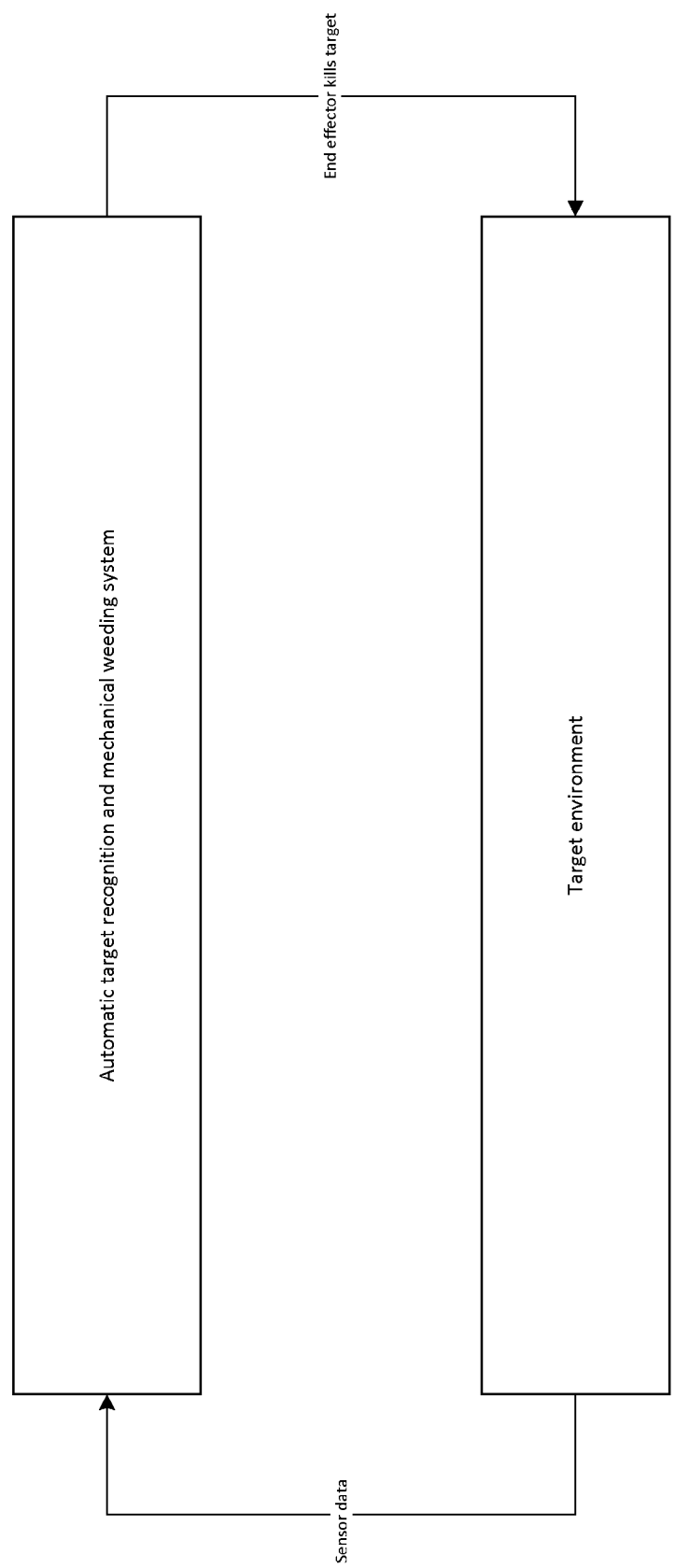
FIG. 8 is a flowchart showing a diagrammatic representation of a high-level control methodology for a weeding apparatus and system in accordance with one embodiment of the invention.

FIG. 8 is a simple flowchart of a high-level control strategy for the system, which should be understood in the context of the apparatus and related system components previously described. In its most basic form, with some details omitted, the system logic in broad overview is as follows: —

Overall System Logic
- evaluation of target environment through sensing systems,
- generation of sensor data based on target environment,
- activation of automatic target recognition and mechanical weeding system,
- killing or dislodging targeted weeds with tine as end effector,
- re-evaluation of target environment, and
- generation of new sensor data.

Figure 9:
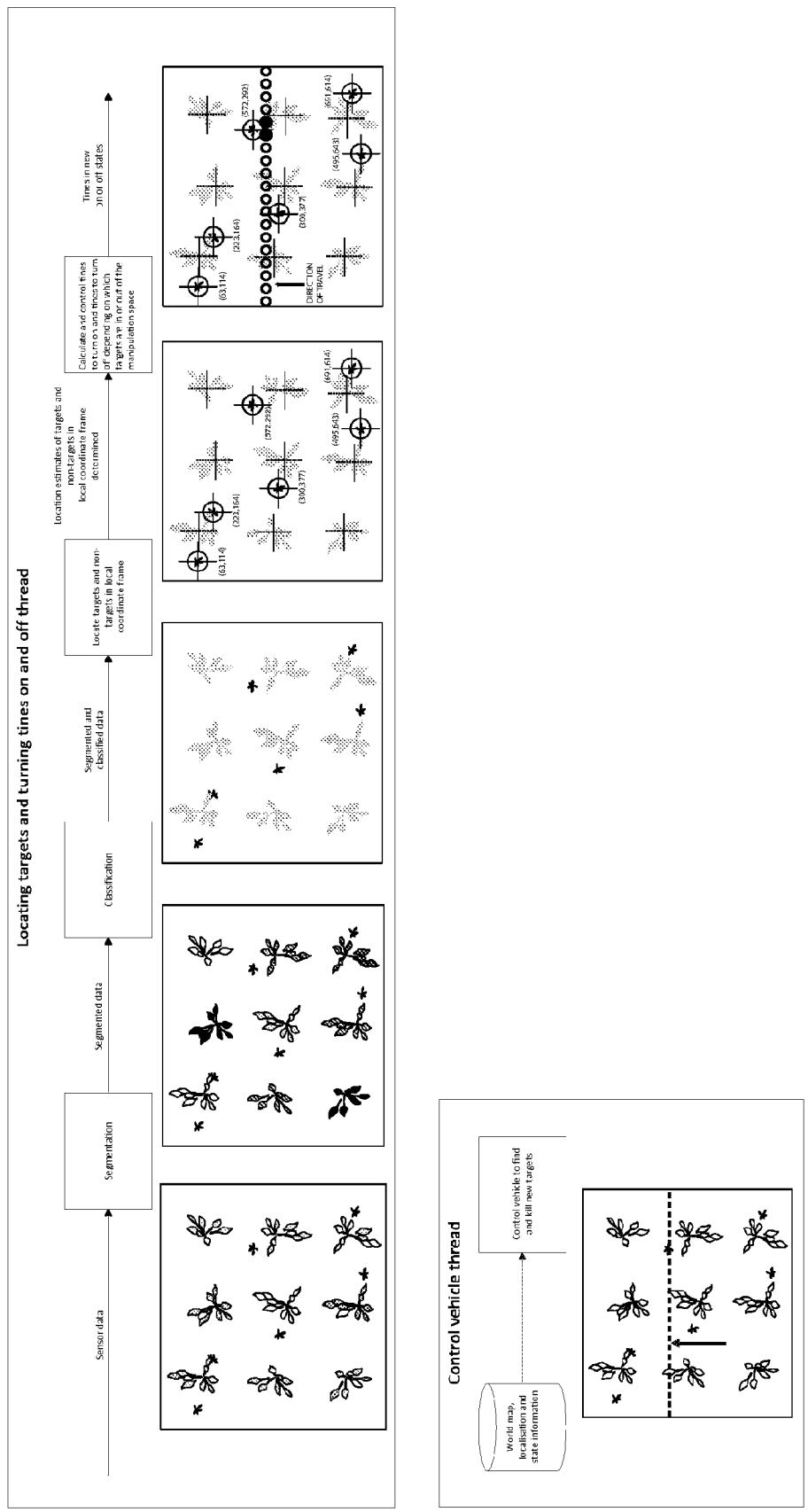
FIG. 9 is a flowchart showing a diagrammatic representation of control logic for locating targets and engaging the tines (without registration) as part of an overall control strategy.

The flowchart of FIG. 9 illustrates in more detail one example of a relatively simple control methodology for locating targets and moving tines between on and off (engaged and disengaged) states, without registration. The methodology for locating targets and engaging tines (using the first control axis), in broad overview, is as follows:

Locating Targets and Engaging Tines (without Registration)

acquisition of sensor data from the initial target area,
segmentation of sensor data from initial target area,
classification of segmented data,
identification of targets and non-targets in local coordinate frame based on segmented and classified data,
determination of location estimates for targets and non-targets in local coordinate frame,
calculate activation sequence and control tines to turn on and off for engagement with targets based on location estimates, depending on which targets are in or out of the manipulation space, tines in new on or off states.

Controlling Vehicle
access world map with localisation and state information,
control vehicle to locate and kill new targets.

Figure 10:
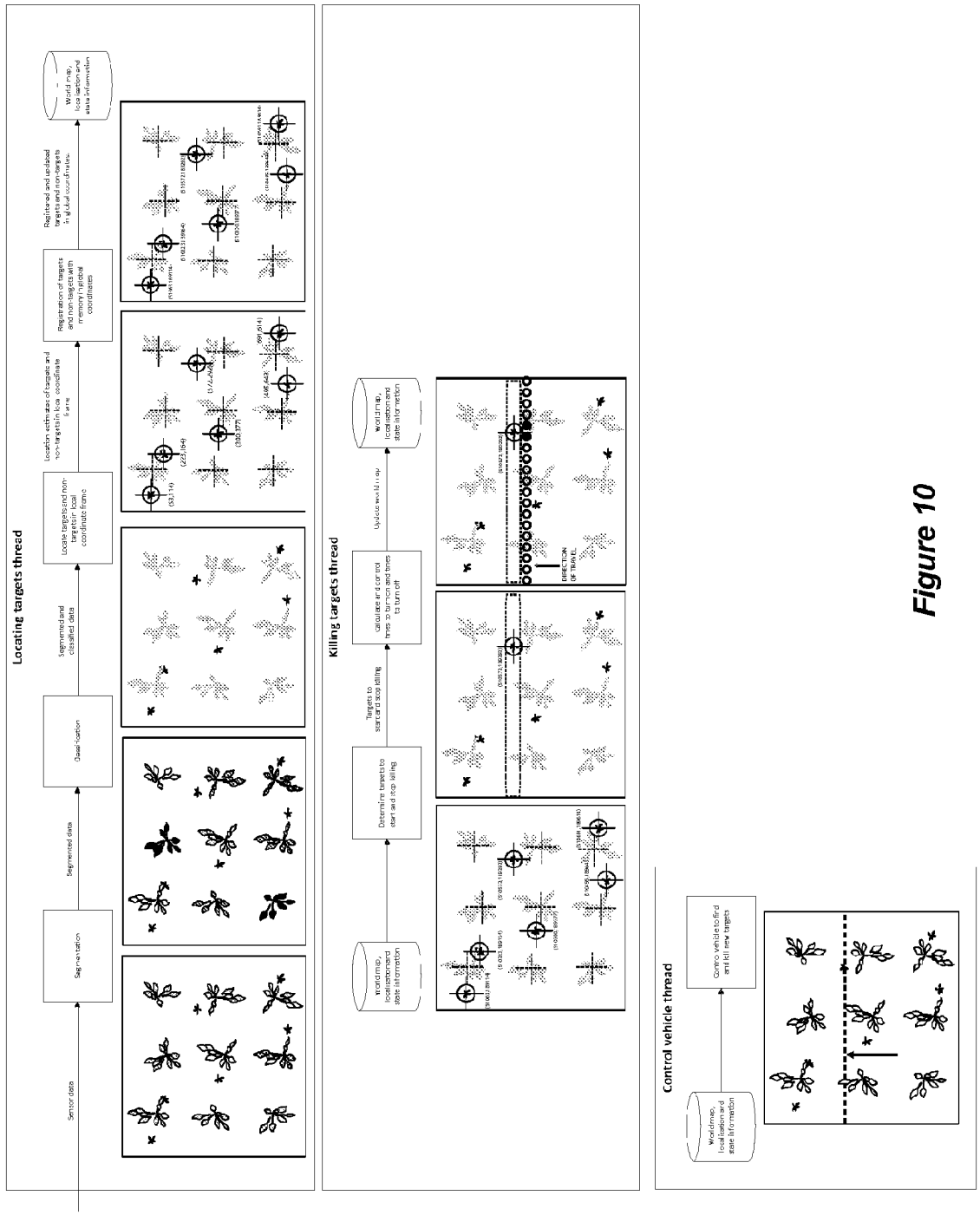
FIG. 10 is a flowchart showing a diagrammatic representation of control logic for locating targets, incorporating registration with a target memory in global coordinates.

FIG. 10 shows a more detailed example of a control methodology for target acquisition, with registration of targets and non-targets with a target memory in global coordinates, based on local estimates of target positions in a global coordinate frame of reference. This enables generation of a world map including localisation and state information based on registered and updated targets in global coordinates. This methodology for locating and killing targets with registration, in broad overview is as follows:

Locating Targets (with Registration)
acquisition of sensor data from the initial target area,
segmentation of sensor data from initial target area,
classification of segmented data,
identification of targets and non-targets in local coordinate frame,
estimation of location of targets and non-targets in local coordinate frame,
registration of targets and non-targets with memory in global coordinates based on local to global estimation,
updating world map with localisation and state information, based on registered and updated targets and non-targets in global coordinates, Killing Targets
accessing world map, with localisation and state information,
determination of targets to start and stop killing based on prioritisation algorithms,
calculation and control of tines for engagement and disengagement with prioritised targets,
updating world map with localisation and state information, Controlling Vehicle
accessing updated world map with localisation and state information,
controlling vehicle to locate and kill new targets.

Figure 11:
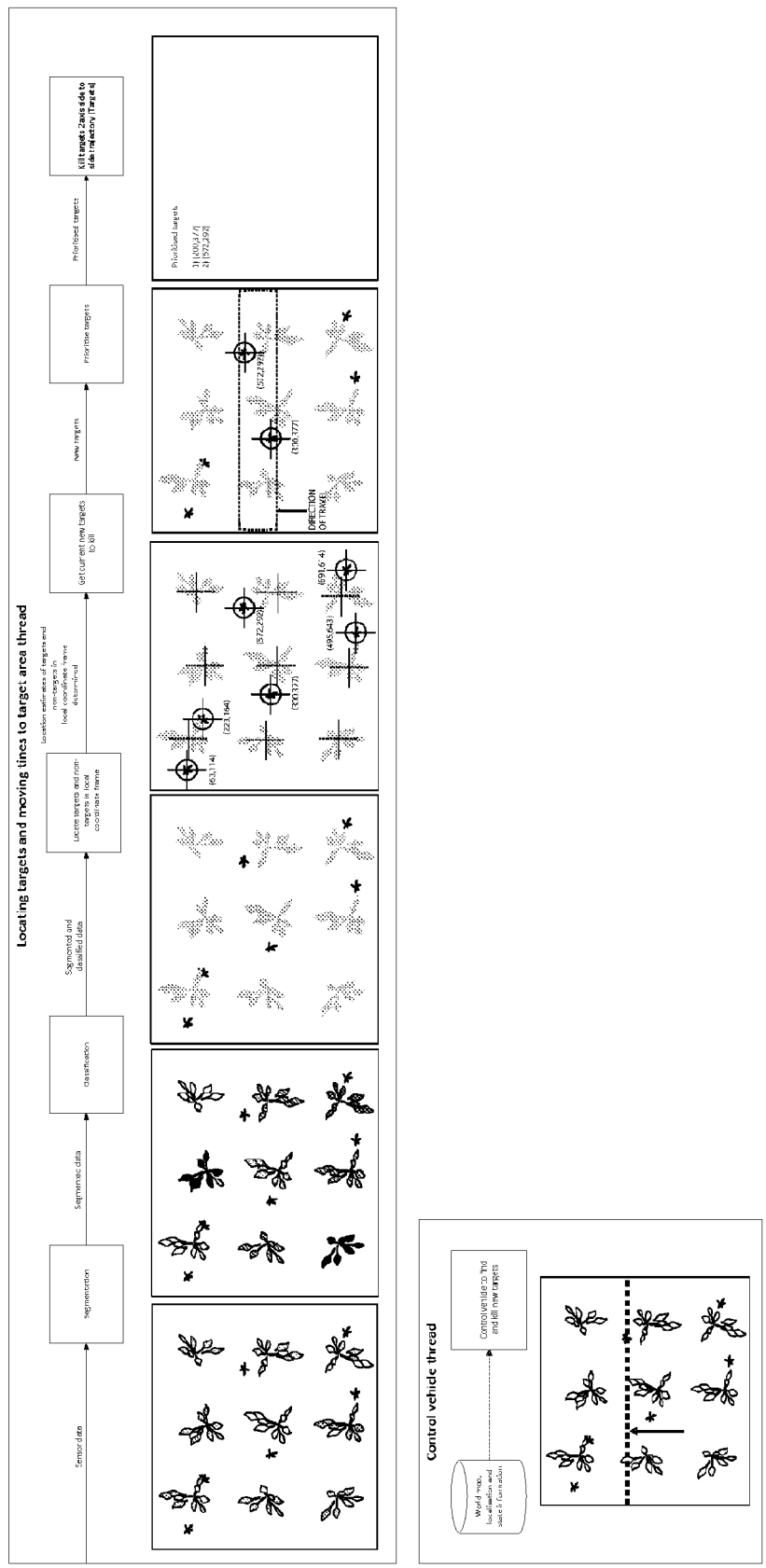
FIG. 11 is a flowchart showing a diagrammatic representation of control logic for locating targets and moving tines to target areas (without registration) as part of an overall control strategy.

FIG. 11 shows an example of a control methodology for locating targets and moving tines to a target area. This methodology, in broad overview, is as follows:

Locating Targets and Moving Tines to Target Area (without Registration)
acquisition of sensor data from initial target area,
segmentation of sensor data from initial target area,
classification of segmented data,
identification of targets and non-targets in local coordinate frame,
determination of location of targets and non-targets in local coordinate frame,
determination of new targets to kill,
prioritisation of targets based on prioritisation algorithm, Killing Targets
calculation and control of tines to kill prioritised target weeds (based on 2-axis control of tines including side to side trajectory), Controlling Vehicle
accessing world map with localisation and state information,
controlling vehicle to locate and kill new targets.

The prioritisation algorithm may be based on a relatively simple "first-in-first-out" (FIFO) prioritisation strategy. In other embodiments, however, additional optimisation parameters may be incorporated into the control strategy, including vehicle velocity, time or distance required for the tine to reach each target, error margins and related consequences (e.g. inadvertently hitting a neighbouring plant rather than a targeted weed in close proximity), opportunity value parameters (e.g. relative size of different target weeds, proximity of target weeds to neighbouring plants, or relative importance of different weed varieties), and the like. In some embodiments, for example those adapted for vacuum weeding, a simple virtual raster scan as defined by the angular range and velocity of the tine axis in the generally horizontal direction and the constant or variable linear motion of the vehicle provides the primary actuator planning path. In this way, targets can be prioritised and acted upon sequentially as they occur along this polar raster scan. In such embodiments, it will be appreciated that although the vehicle may or may not need to stop at each target, there is generally no requirement for the vehicle to make undesirable and inefficient backtracking movement due to the constantly forward planning methodology.

Figure 12:
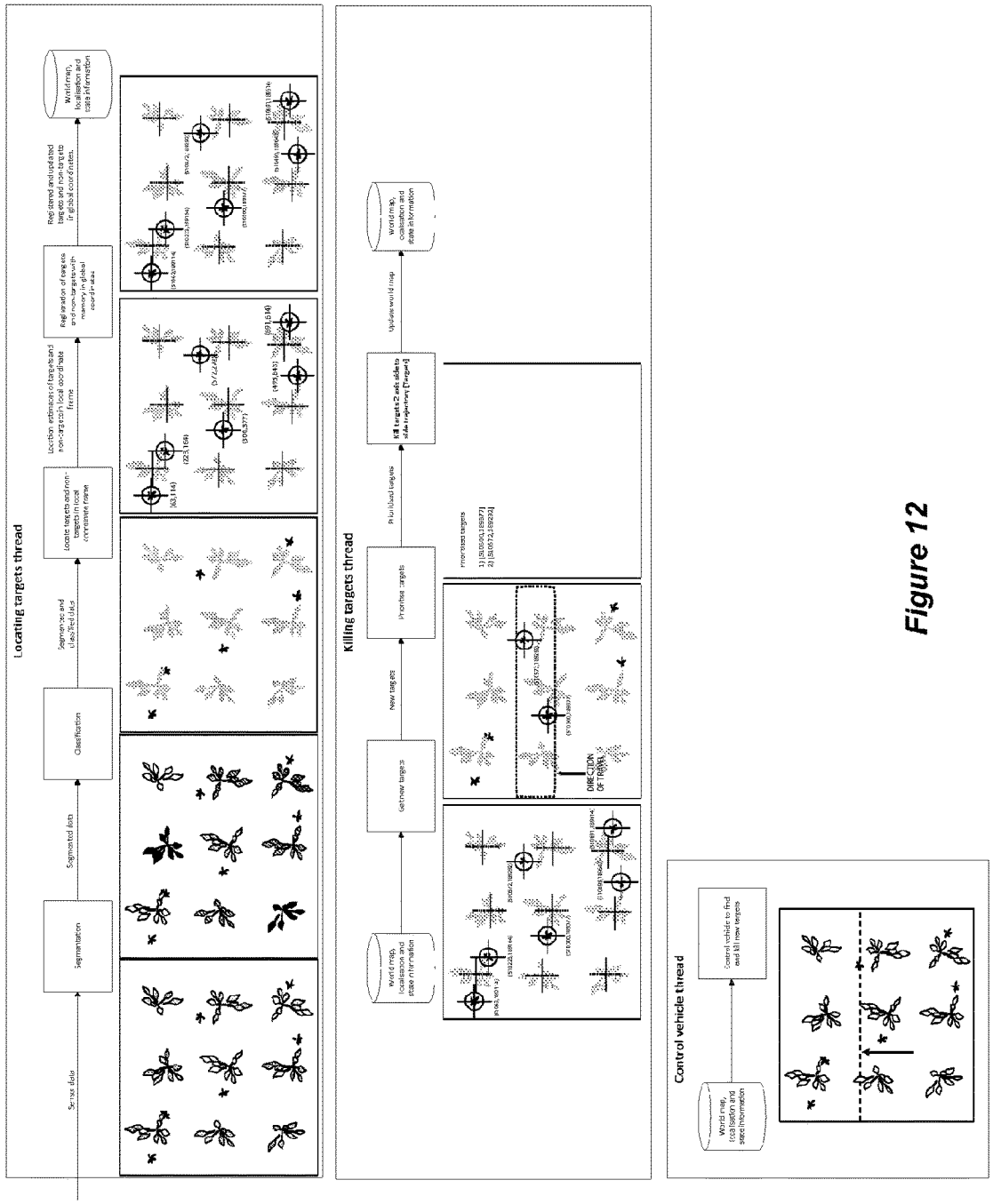
FIG. 12 is a flowchart showing a diagrammatic representation of control logic for locating and killing target weeds, incorporating registration with a target memory in global coordinates.

FIG. 12 shows an example of a control methodology for locating and killing target weeds, with registration of targets with target memory in global coordinates, based on local estimates of target positions in a global coordinate frame of reference. Again, this enables generation of a world map including localisation and state information based on registered and updated targets in global coordinates.

This methodology for locating and killing target weeds with registration, in broad overview, is as follows:

Locating Targets (with Registration)
acquisition of sensor data from initial target area,
segmentation of sensor data from initial target area,
classification of segmented data,
identification of targets and non-targets in local coordinate frame,
determination of location of targets and non-targets in local coordinate frame,
(based on local coordinates derived from segmented and classified data, and local to global estimation),
registration of targets with target memory in global coordinates based on local to global estimation,
updating world map with localisation and state information, based on registered and updated targets in global coordinates, Killing Targets
accessing world map, with localisation and state information,
determination of new targets to kill,
prioritisation of targets based on prioritisation algorithm,
calculation and control of tines to kill prioritised target weeds (based on 2-axis control of tines including side to side trajectory),
updating world map with localisation and state information, Controlling Vehicle
accessing updated world map with localisation and state information,
controlling vehicle to locate and kill new targets.

Figure 13:
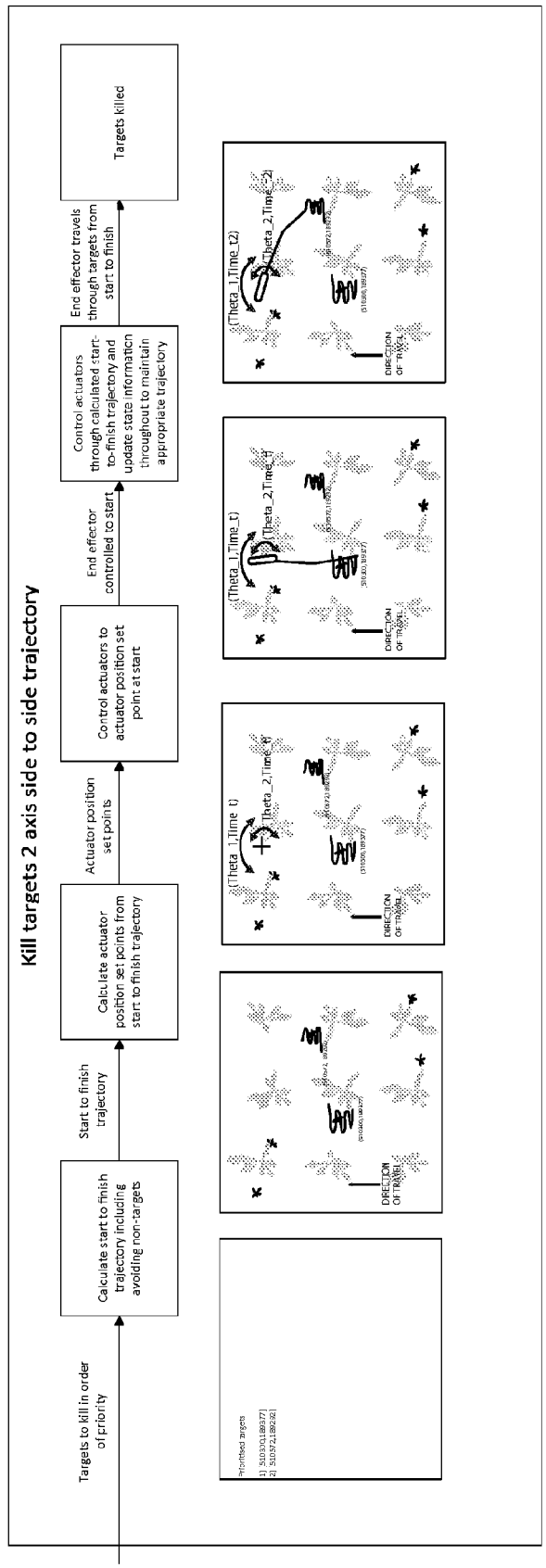
FIG. 13 is a flowchart showing a diagrammatic representation of control logic for killing or disrupting weeds, based on a side-to-side trajectory of the tines, as part of an overall control strategy using the apparatus and system according to one embodiment of the invention.
Figure 14:
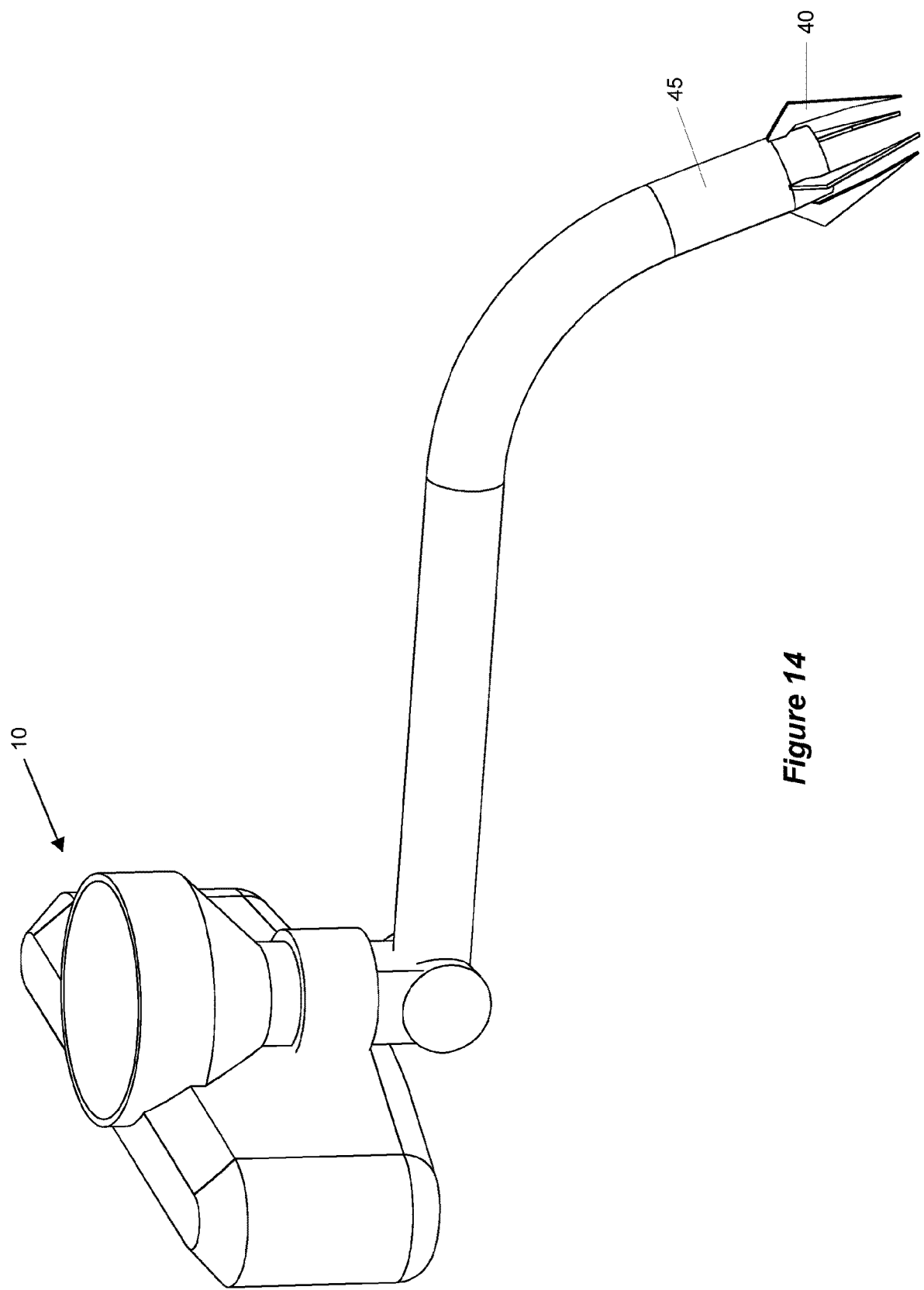
FIG. 14 is a perspective view showing an alternative embodiment of the tine and tine support assembly, incorporating a multi-prong end effector weeding implement coaxially coupled to a hose of a vacuum system, and leading to a mulching device.
Figure 15:
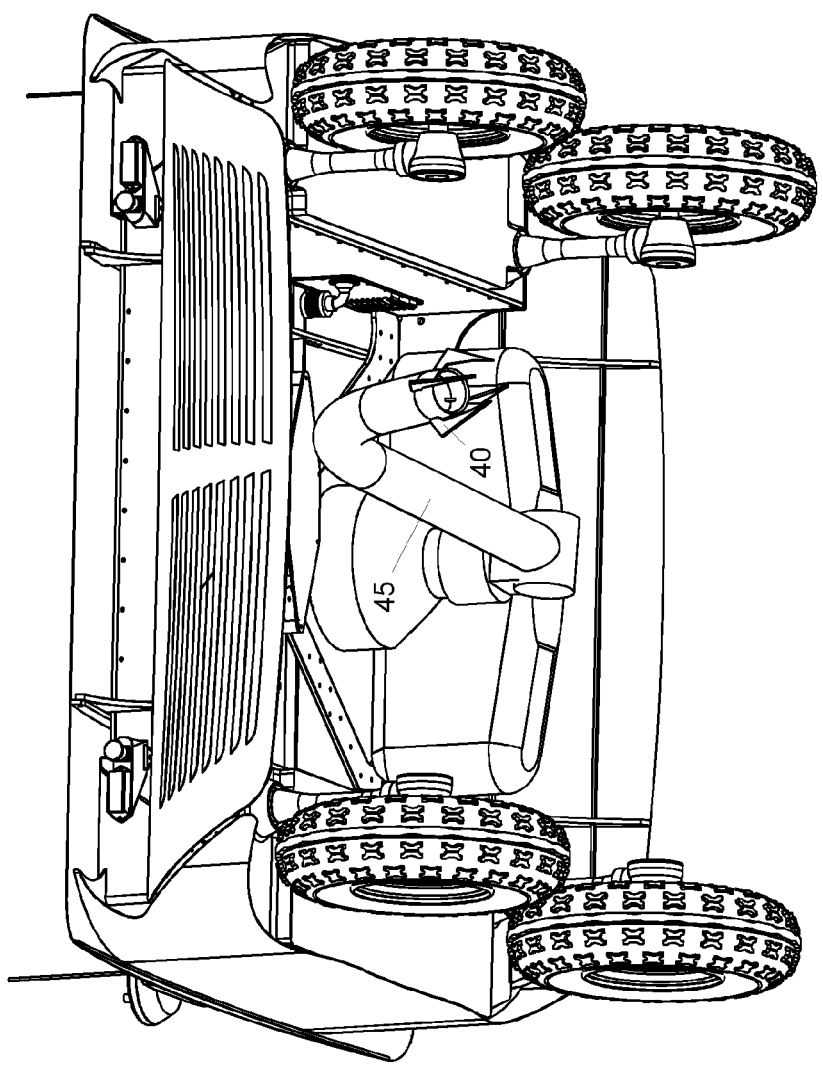
FIG. 15 is a perspective view of an autonomous agricultural weeding apparatus incorporated into an omni-directional unmanned ground vehicle (UGV) with the multi-prong implement and vacuum system of FIG. 14.
Figure 16:
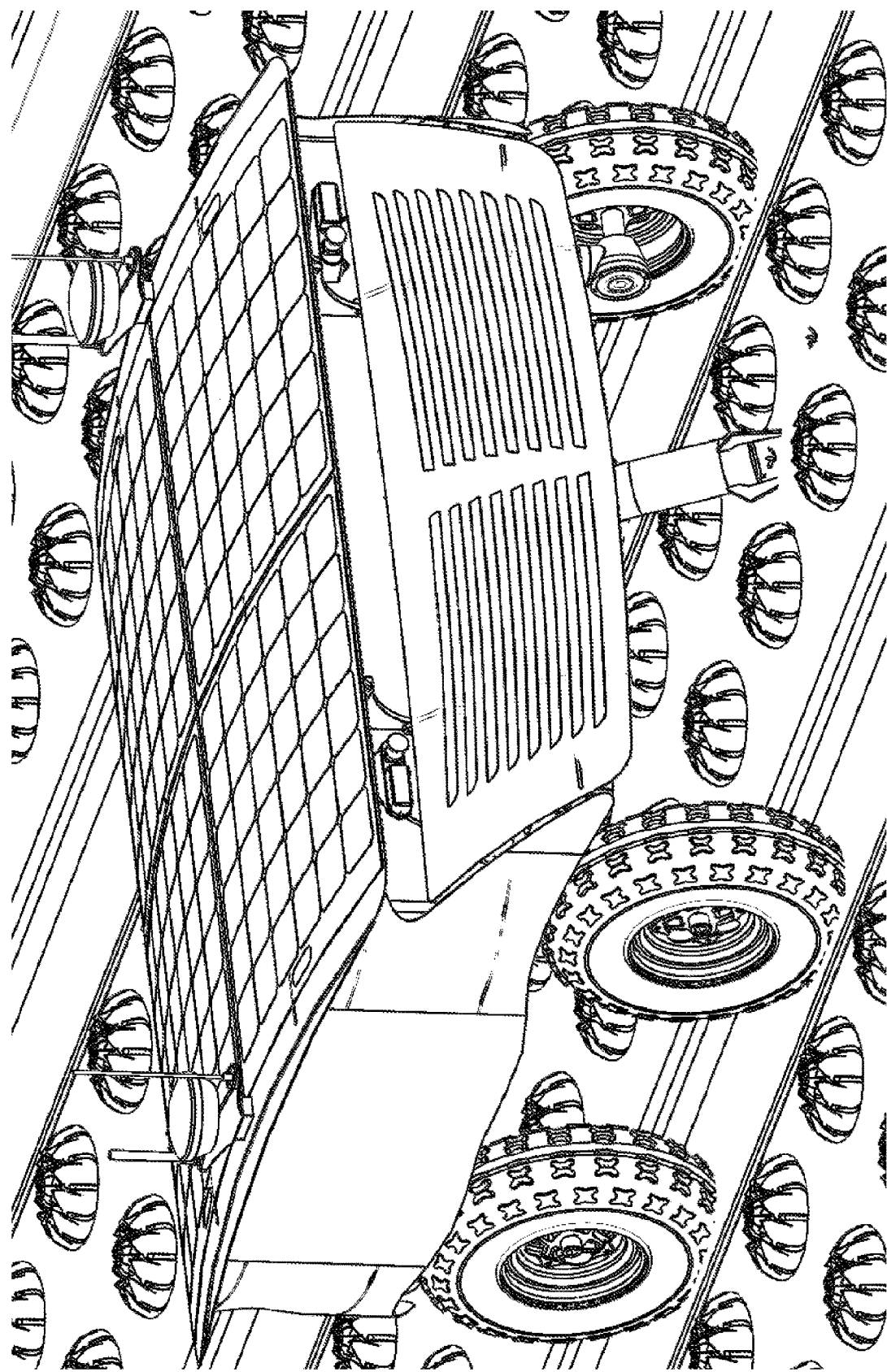
FIG. 16 shows the omni-directional unmanned ground vehicle (UGV) of FIG. 15 travelling above a crop bed, targeting weeds for removal.
Figure 17:
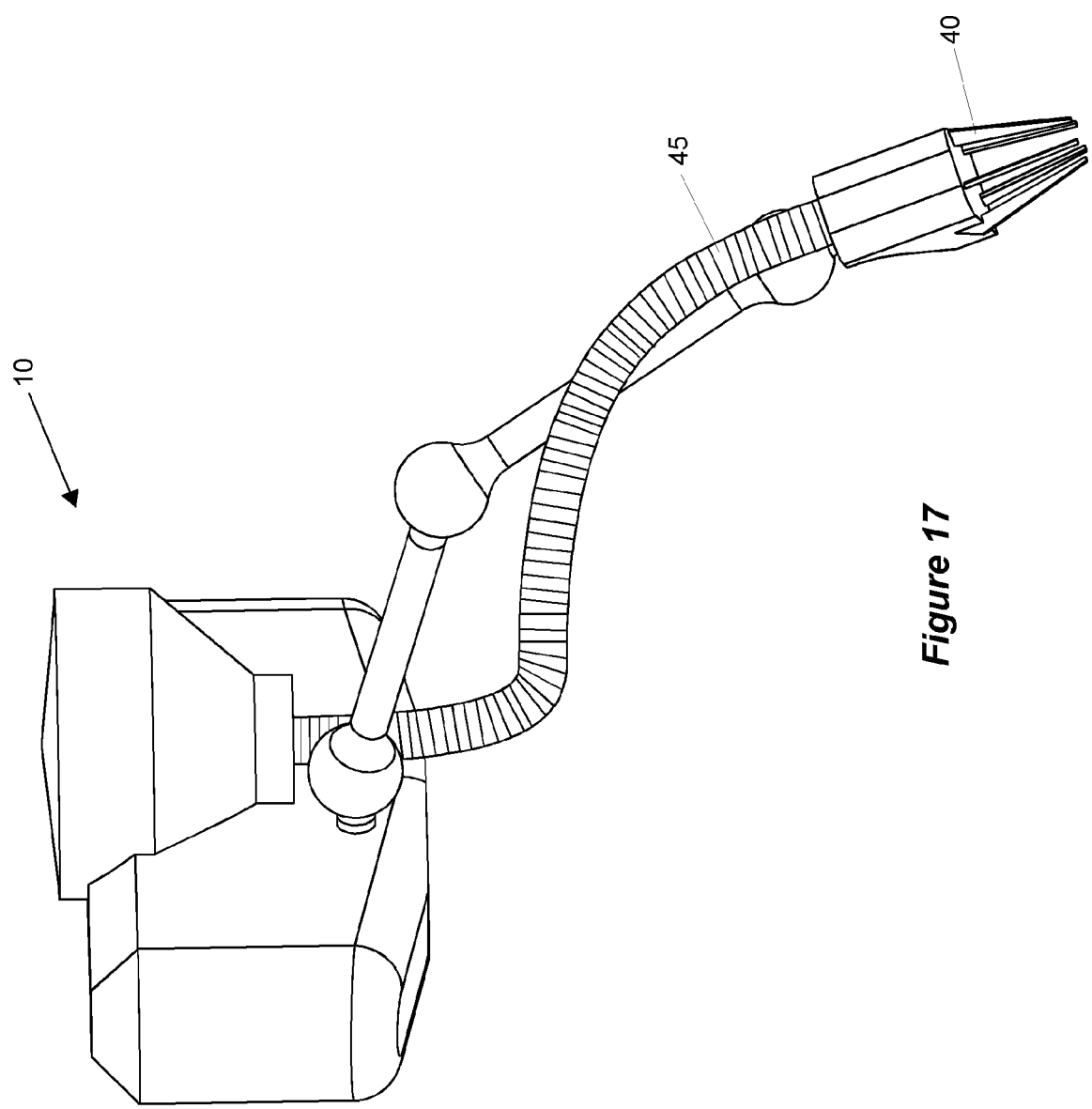
FIG. 17 is a perspective view showing an alternative embodiment of the tine and tine support assembly in which a multi-prong end effector is mounted to a multi-DOF robotic arm, and a vacuum hose is positioned adjacent to the multi-prong end effector and leads to a mulching device.

For the embodiment of the invention shown in FIGS. 1 to 4, whereby targeted weeds are killed, dislodged or disrupted by a side-to-side trajectory of the tine in conjunction with forward movement of the UGV or other prime mover, common control functions may be employed, irrespective of the specific targeting and registration strategies employed. FIG. 13 shows an example of such common functions for killing target weeds based on 2-axis control and side-to-side trajectory of the tine.

This common control methodology, in broad overview, is as follows: —

Killing Targets with Side-To-Side Tine Trajectory
  identification of target weeds to kill in order of priority,
  calculation of start to finish trajectory including avoidance of non-targets,
  calculation of actuator position set points from start to finish trajectory,
  controlling actuators to actuator position set points at start,
  controlling actuators through calculated start to finish trajectory,
  updating state information throughout to maintain calculated trajectory,
  movement of end-effector (tine) through targets from start to finish,
  killing targets based on movement of tine through start to finish trajectory,
  updating world map (if relevant), and
  identification and prioritisation of next targets.

The common control methodology, as defined in FIG. 13, can be adapted for tasks where each target requires only manipulation at a predefined primary point (e.g. centre point) rather than across a trajectory. For example, when vacuum weeding, dripping or using spinning tool end effectors, the end effector may only need to move to the centre point of each target, rather than across a trajectory path through each target since the end effector itself is able to effectively kill the entire weed from the centre point of that weed.

In the embodiment of FIGS. 5 to 7, it will be appreciated that the control strategy for determining a side to side trajectory for the single tine of the first embodiment will not be directly applicable. Rather, in this case, the control strategy will determine the optimum combination of tines from the array to activate, and the timing of that activation, in order to kill or dislodge the targeted weeds. As shown in FIG. 5, this may involve engagement of discrete combinations or clusters of tines, for example clusters of three, four or five adjacent tines simultaneously, in order to hit the targeted weeds. Of course, multiples of such clusters may be activated simultaneously.

The implementation of these control strategies under the rules, guidelines, procedures and objectives as outlined will be well within the capabilities of those skilled in the art, and so will not be described in more detail. It will be similarly understood that various additional, complementary or alternative control strategies and methodologies may be utilised for particular applications, within the scope of the inventive concepts as described.

For example, in some embodiments, the end effector may take a form other than a tine point such as a round bar, hoe, scythe, knife, cultivator, fork, brush, disk or other implement suited to specific purposes. It may also incorporate a robotic or passive gripper as end effector, for collecting and disposing of weeds in bins or receptacles within range of the control axes. It may also incorporate cutting tools such as knives, blades or scissor formations, pollination tools such as dusters, brushes, sprayers or powder blowers, precision applicators such as drippers, brushes, sprayers or gel applicators, sticky surfaces incorporating tape, glue or other adhesive means, or cleaning tools such as brushes, brooms, mops, sprayers, steamers, rakes or vacuum nozzles. Furthermore, these tools may also be adapted for various auxiliary tasks beyond weeding and waste removal such as selectively thinning and selectively harvesting crops. In some embodiments, the classification process may be used to differentiate between targets of different size, shape or colour to determine the weed variety and/or the degree of weed development and this data may in turn be used to refine the targeting and/or prioritisation processes. Moreover, the apparatus may include ancillary equipment such as irrigation tanks and spray nozzles to irrigate crops at the same time as killing weeds, or incorporate weed collection implements and receptacles to minimise the propensity for weed re-growth.

The invention in its various preferred forms provides a number of unique attributes and advantages, including the flexibility to target individual weeds at arbitrary locations, allowing the system to operate effectively in relatively random as distinct from only in highly ordered or structured environments. The ability of the apparatus to cover more than one planted row with a single tine leads to benefits in terms of cost, simplicity, size, weight and operational efficiency. The ability to disengage the tine(s) from the ground when not in active use minimises drag and soil disruption, which in turn minimises energy consumption, while also allowing adjustability of the contact force on the ground as well as penetration depth. The apparatus is able to accurately target weeds in close proximity to obstacles such as crops, sprinklers, irrigation lines or fence posts.

The ability to trace complex trajectories on the ground or target specific points on the ground using a precision tine point, as distinct from dragging a relatively wide blade or brush, further enhances precision targeting while further minimising soil disruption and energy consumption. The ability to move only the tine as a simple and lightweight end effector, as distinct from a large-scale implement or implement assembly, potentially reduces the number of system components, power requirements, mass and complexity. The flexibility for precise and progressive control over the tine as an end effector by means of proportional electric servo motors or other progressive actuators, as distinct from more conventional on-off hydraulic control, is also advantageous. The system is also highly adaptable in terms of its ability to enable substitution of a broad range of alternative end effectors and associated control strategies, and to integrate with a variety of platforms, devices, prime movers, and other vehicles including autonomous vehicles. In these and other respects, the invention represents a practical and commercially significant improvement over the prior art.

Although the invention has been described with reference to specific examples, it will be appreciated by those skilled in the art that the invention may be embodied in many other forms.

What is claimed is:

1. An apparatus for controlling weeds, the apparatus including:
  a plurality of tine formations disposed in a generally transverse linear array, each tine formation being operable in use to remove or disrupt targeted weeds;
  a tine support assembly adapted to support the tine formations for movement of each tine formation about a respective transverse horizontally oriented rotational control axis in a generally vertical direction, whereby each tine formation in the array is independently movable in use between an engaged position wherein the respective tine formation contacts a ground surface for removal or disruption of targeted weeds and a disengaged position wherein the tine formation is substantially retracted from the ground surface;

a plurality of first actuation mechanisms, each adapted to effect movement of a respective one of the tine formations about it rotational control axis;

a sensing system for sensing aspects of an environment and generating data indicative thereof;

a classification system for identifying target weeds within the environment on the basis of the data from the sensing system; and a control system adapted independently to activate the actuation mechanisms in accordance with a predetermined control logic thereby to position the respective tine formations for disruptive contact with the targeted weeds.

2. The apparatus according to claim 1, wherein the rotational control axes of the plurality of tine formations are collinear.

3. The apparatus according to claim 1, wherein the rotational control axes of the plurality of tine formations are offset or staggered.

4. The apparatus according to claim 1, wherein the tine support assembly comprises a plurality of supporting bodies, and wherein each tine formation is mounted on a respective supporting body.

5. The apparatus according to claim 4, wherein the actuation mechanism for a tine formation is mounted externally to the supporting body.

6. The apparatus according to claim 4, wherein the actuation mechanism for a tine formation is mounted within the supporting body.

7. The apparatus according to claim 1, wherein the actuation mechanism for a tine formation comprises a hydraulic actuator, a pneumatic actuator, and/or an electric servomotor.

8. The apparatus according to claim 1, comprising a tine self-cleaning control mode wherein the tines clean themselves by way of relative movement or rapid shuffling between adjacent tines to dislodge earth, rocks or other debris.

* * * * *